United States Patent
Soohoo et al.

(10) Patent No.: US 11,373,231 B2
(45) Date of Patent: Jun. 28, 2022

(54) SYSTEM AND METHOD FOR DETERMINING SUBSTITUTES FOR A REQUESTED PRODUCT AND THE ORDER TO PROVIDE THE SUBSTITUTES

(71) Applicant: Walmart Apollo, LLC, Bentonville, AR (US)

(72) Inventors: Anthony Soohoo, Palo Alto, CA (US); Vijay Raghavendra, San Jose, CA (US); Charles Myslinsky, Glen Ridge, NJ (US); Harman Kochar, San Mateo, CA (US); Abilash Amarthaluri, San Jose, CA (US); Ashish Gupta, Lucknow (IN); Karthik Deivasigamani, Chennai (IN); Behzad Ahmadi, San Jose, CA (US); Sreyash D. Kenkre, Bengaluru (IN); Rohit Deep, Union City, CA (US); Zuzar Fakhruddin Nafar, Mountain View, CA (US); Omer Ovenc, San Jose, CA (US); Venkatesh Kandaswamy, San Ramon, CA (US); Arvind Senthil Kumaran, Sunnyvale, CA (US); Suleman Ashfaq, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 221 days.

(21) Appl. No.: 16/264,323

(22) Filed: Jan. 31, 2019

(65) Prior Publication Data
US 2020/0250731 A1  Aug. 6, 2020

(51) Int. Cl.
G06Q 30/06 (2012.01)
G06N 20/00 (2019.01)
(Continued)

(52) U.S. Cl.
CPC ........ *G06Q 30/0631* (2013.01); *G06N 20/00* (2019.01); *G06Q 10/087* (2013.01);
(Continued)

(58) Field of Classification Search
CPC ............. G06Q 30/0631; G06Q 10/087; G06Q 30/0601–0645; G06N 20/00; G06F 40/20; G06K 9/4652; G06K 9/6215
(Continued)

(56) References Cited

U.S. PATENT DOCUMENTS 8,990,199 B1 * 3/2015 Ramesh ............ G06F 16/5838
707/736
9,881,226 B1 * 1/2018 Rybakov ............ G06K 9/00201
(Continued)

FOREIGN PATENT DOCUMENTS

| CN | 105427125 A | 3/2016 |
|---|---|---|
| WO | 2007048008 | 4/2007 |
| WO | 2010141637 | 12/2010 |

OTHER PUBLICATIONS

Huang et al., A graph model for E-commerce recommender systems, Journal of the American Society for Information Science and Technology, Feb. 1, 2004 (Year: 2004).*
(Continued)

*Primary Examiner* — Allison G Wood
*Assistant Examiner* — Anna Mae Mitros
(74) *Attorney, Agent, or Firm* — Bryan Cave Leighton Paisner LLP

(57) ABSTRACT

A system can include one or more processors and non-transitory computer-readable media storing computing instructions configured to run on the one or more processors and perform a method for determining one or more substitutes for a product requested in an inquiry from a user and
(Continued)

the order of the one or more substitutes to be transmitted to the user. The method can comprise: receiving an inquiry from a user, wherein the inquiry comprises an image and a text describing a requested product; extracting one or more visual attributes of the requested product based on the image; extracting one or more textual attributes of the requested product based on the text; determining a first projected requested product, in a product graph relating to a domain of the requested product, based on the one or more visual attributes of the requested product; determining a second projected requested product in the product graph based on the one or more textual attributes of the requested product; and determining one or more substitutes for the requested product. In this embodiment, the one or more substitutes for the requested product can be determined by: determining one or more first candidates, each first candidate of the one or more first candidates existing in both the product graph and an inventory database and comprising a visual distance between the first projected requested product and the each first candidate in the product graph; determining one or more second candidates, each second candidate of the one or more second candidates existing in both the product graph and the inventory database and comprising a textual distance between the second projected requested product and the each second candidate in the product graph, the one or more substitutes comprising the one or more first candidates and the one or more second candidates; determining a score of a candidate substitute of the one or more substitutes based on a visual distance and a textual distance of the candidate substitute of the one or more substitutes; and sorting the one or more substitutes based on the score of the candidate substitute of the one or more substitutes. In this embodiment, after the one or more substitutes are determined and sorted, this method can further comprise: in response to receiving the inquiry from the user, automatically transmitting to the user higher ranked ones of the one or more substitutes. Additionally, in this embodiment, the product graph can be dynamically generated by a machine learning module based on information about the domain of the requested product; and the product graph can comprise: (a) one or more product nodes, the one or more product nodes comprising the one or more substitutes; (b) one or more entity nodes, the one or more entity nodes comprising the one or more visual attributes and the one or more textual attributes of the requested product; (c) one or more entity-entity connections between each pair of related entity nodes of the one or more entity nodes; (d) one or more product-entity connections between a product node of the one or more product nodes and an entity node of the one or more entity nodes, wherein the entity node is related to the product node; and (e) one or more product-product connection between a first product node of the one or more product nodes and a second product node of the one or more product nodes, wherein the first product node and the second product node are determined to be substitutable by or complimentary of each other. Other embodiments are disclosed.

20 Claims, 13 Drawing Sheets

(51) Int. Cl.
G06Q 10/08 (2012.01)
G06K 9/62 (2022.01)
G06F 40/20 (2020.01)
G06V 10/56 (2022.01)

(52) U.S. Cl.
CPC ............ G06F 40/20 (2020.01); G06K 9/6215 (2013.01); G06V 10/56 (2022.01)

(58) Field of Classification Search
USPC ...................................... 705/26.7, 26.1–27.2
See application file for complete search history.

(56) References Cited

U.S. PATENT DOCUMENTS

| | | | |
|---|---|---|---|
| 10,339,586 B1* | 7/2019 | Khobragade | G06Q 30/0631 |
| 2002/0099675 A1 | 7/2002 | Agrafiotis et al. | |
| 2002/0161664 A1 | 10/2002 | Shaya et al. | |
| 2003/0208399 A1 | 11/2003 | Basak et al. | |
| 2006/0026048 A1 | 2/2006 | Kolawa et al. | |
| 2008/0046410 A1* | 2/2008 | Lieb | G06F 16/5838 |
| 2009/0281895 A1 | 11/2009 | Selinger et al. | |
| 2010/0076867 A1* | 3/2010 | Inoue | G06F 16/583 705/26.1 |
| 2010/0205167 A1 | 8/2010 | Tunstall-Pedoe et al. | |
| 2011/0320482 A1 | 12/2011 | Barbieri et al. | |
| 2012/0095879 A1 | 4/2012 | Wijaya et al. | |
| 2012/0197751 A1 | 8/2012 | Zatkin et al. | |
| 2013/0039588 A1* | 2/2013 | Li | G06T 1/0028 382/201 |
| 2014/0089133 A1 | 3/2014 | Argue et al. | |
| 2016/0104232 A1 | 4/2016 | Perks et al. | |
| 2016/0180402 A1 | 6/2016 | Sabah et al. | |
| 2017/0206577 A1* | 7/2017 | Hunsaker | G06F 30/15 |
| 2018/0225675 A1 | 8/2018 | Rosenberg | |
| 2018/0276727 A1* | 9/2018 | Patel | G06Q 30/0625 |
| 2019/0149626 A1* | 5/2019 | Shah | H04L 67/22 706/12 |
| 2020/0250729 A1 | 8/2020 | Soohoo et al. | |

OTHER PUBLICATIONS

Wikipedia, "Bayesian Network," https://en.wikipedia.org/wiki/Bayesian_network, pp. 1-8, accessed Jan. 7, 2020.

Giri, et al., "Analysis of Pricing Decision for Substitutable and Complementary Products with a Common Retailer," Pacific Science Review A: Natural Science and Engineering, vol. 18, Issue 3, Nov. 2016, pp. 190-202, https://doi.org/10.1016/j.psra.2016.09.012, 2016.

Amazon Web Services, "Browse Nodes—Product Advertising API," https://web.archive.org/web/20171228092810/http://docs.aws.amazon.com/AWSECommerceService/latest/DG/BrowseNodes.html, 2017.

Amazon Web Services, "SimilarityLookup—Product Advertising API," https://web.archive.org/web/20191210155540/https://docs.aws.amazon.com/AWSECommerceService/latest/DG/SimilarityLookup.html, 2019.

McAuley, et al., "Inferring Networks of Substitutable and Complementary Products," KDD '15: Proceedings of the 21th ACM SIGKDD International Conference on Knowledge Discovery and Data Mining, Aug. 2015, pp. 785-794, https://doi.org/10.1145/2783258.2783381, 2015.

"Living Economics: Complements and Substitutes (transcript)," https://livingeconomics.org/article.asp?docId=289 (accessed Feb. 11, 2021).

Jure Leskovec, Pinterest & Stanford University, "Discovering Networks of Products," Jul. 26, 2015, https://www.slideshare.net/turi-inc/inferring-networks-of-substitute-and-complementary-products (follow "Download" hyperlink), 2015.

Amit Sharma, "Learning Functionality Graph of Products: Substitute and Complementary Relations on Amazon," Dec. 18, 2010, pp. 1-13, http://www.cs.cornell.edu/courses/cs6780/2010fa/projects/sharmaamit_cs6780.pdf, 2010.

* cited by examiner

SYSTEM AND METHOD FOR DETERMINING SUBSTITUTES FOR A REQUESTED PRODUCT AND THE ORDER TO PROVIDE THE SUBSTITUTES

TECHNICAL FIELD

This disclosure relates generally to providing substitutes for a product requested and described in an inquiry and transmitting the substitutes in an order based on the similarity scores to a user submitting the inquiry.

BACKGROUND

Users of an online retail system generally search for a product by submitting an inquiry that includes a brief description, such as one or more keywords, and/or an image, such as a picture or a sketch. Unless the keywords or the image uniquely define an existing product in inventory, it is generally a trial-and-error process for the users to add or change the search criteria in the inquiry to find the most relevant products as proposed substitutes for the requested product. Although a user provides keywords and/or images for the search criteria, other implicit expectations may affect the user's determining whether the proposed substitutes are similar enough. In addition, users generally prefer to see the proposed substitutes in a descending order based on how closely the proposed substitutes match the search criteria. Therefore, systems and methods for determining substitutes for a requested product based on not only the expressed search criteria, but also the context, and providing the substitutes based on the respective rankings are thus desired.

BRIEF DESCRIPTION OF THE DRAWINGS

To facilitate further description of the embodiments, the following drawings are provided in which.

Figure 1:
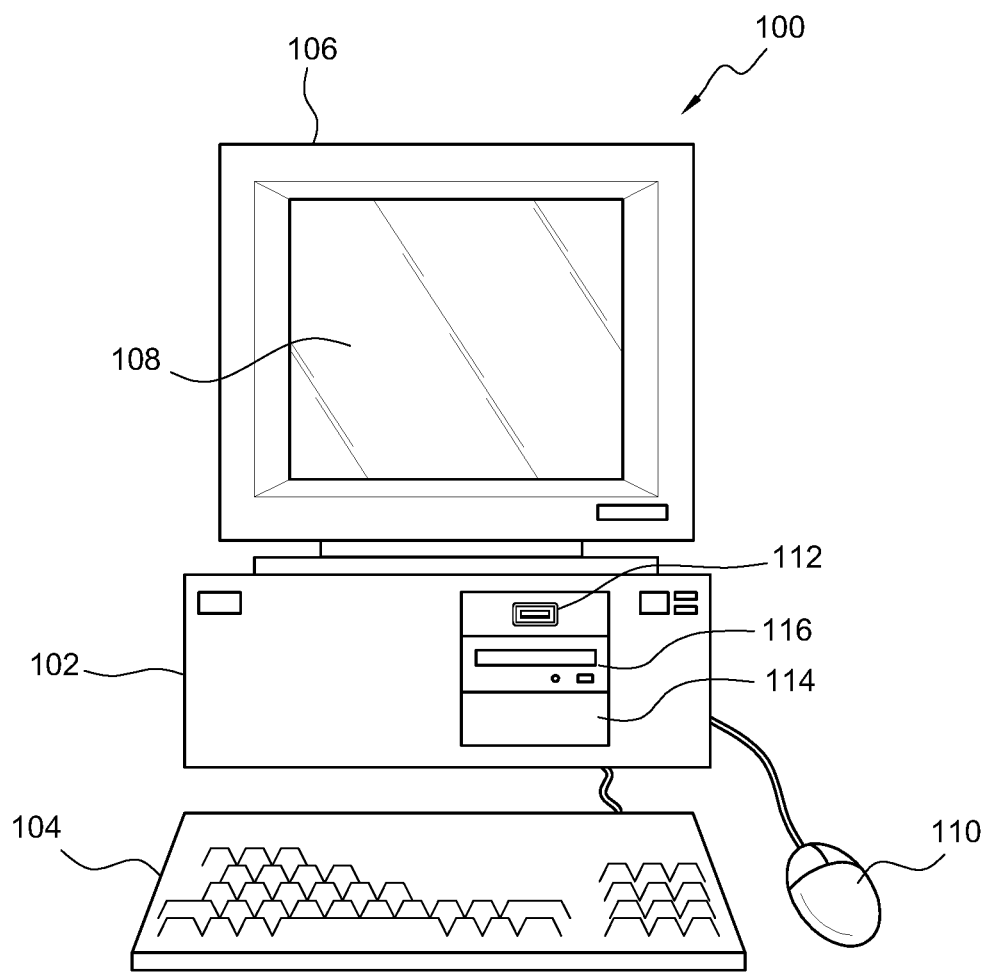
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

In an embodiment, a method can be implemented via execution of computing instructions configured to run at one or more processors and stored at one or more non-transitory computer-readable media. The method can comprise: receiving an inquiry, from a user, which comprises a requested product; extracting one or more attributes of the requested product based on the inquiry; determining a context of the inquiry; and determining one or more substitutes for the requested product from an inventory database based on a distance between the requested product and each substitute of the one or more substitutes, as projected in a product graph relating to a domain of the requested product and the context of the inquiry. The product graph relating to the domain can be generated by a machine learning module.

In this embodiment, the machine learning module can be configured to dynamically learn information about the domain from one or more expert opinions, the inventory database, and public records. Based on the information about the domain, the machine learning module can create one or more product categories in the domain and extract one or more entity nodes from the one or more product categories to the product graph. The machine learning module also can create another one or more entity nodes based on the one or more entity nodes, each of the another one or more entity nodes being related to at least one of the one or more entity nodes according to a first set of criteria, such as their linguistic relationships. The product graph can comprise a set of entity nodes including the one or more entity nodes and the another one or more entity nodes.

Furthermore, the machine learning module in this embodiment can be configured to build various types of connections in the product graph. One of the connections the machine learning module can build is an entity-entity connection between each pair of entity nodes of the set of entity nodes in the product graph, when the each pair of entity nodes are either associated with one of the one or more product categories or related to each other according to the first set of criteria. In addition, the machine learning module in this embodiment can build a product-entity connection between an entity node of the set of entity nodes and a product node of a set of product nodes that is selected from the information about the domain and related to the entity node based on the information about the domain. The machine learning module in this embodiment also can build a product-product connection between a first product node and a second product node selected from the set of product nodes when the first product node and the second product node are determined to be substitutable by or complimentary of each other based on the information about the domain.

In another embodiment, a system can comprise one or more processors and one or more non-transitory computer-readable media storing computing instructions. The computing instructions of this embodiment can be configured to run on the one more processors and perform: receiving an inquiry from a user which comprises a requested product; extracting one or more attributes of the requested product based on the inquiry; determining a context of the inquiry; and determining one or more substitutes for the requested product from an inventory database based on a distance between the requested product and each substitute of the one or more substitutes, as projected in a product graph relating to a domain of the requested product and the context of the inquiry. In this embodiment, the product graph relating to the domain can be generated by a machine learning module. The machine learning module of this embodiment can be similar to the machine learning module of the previous embodiment and configured to perform similar activities as the machine learning module of the previous embodiment.

Figure 2:
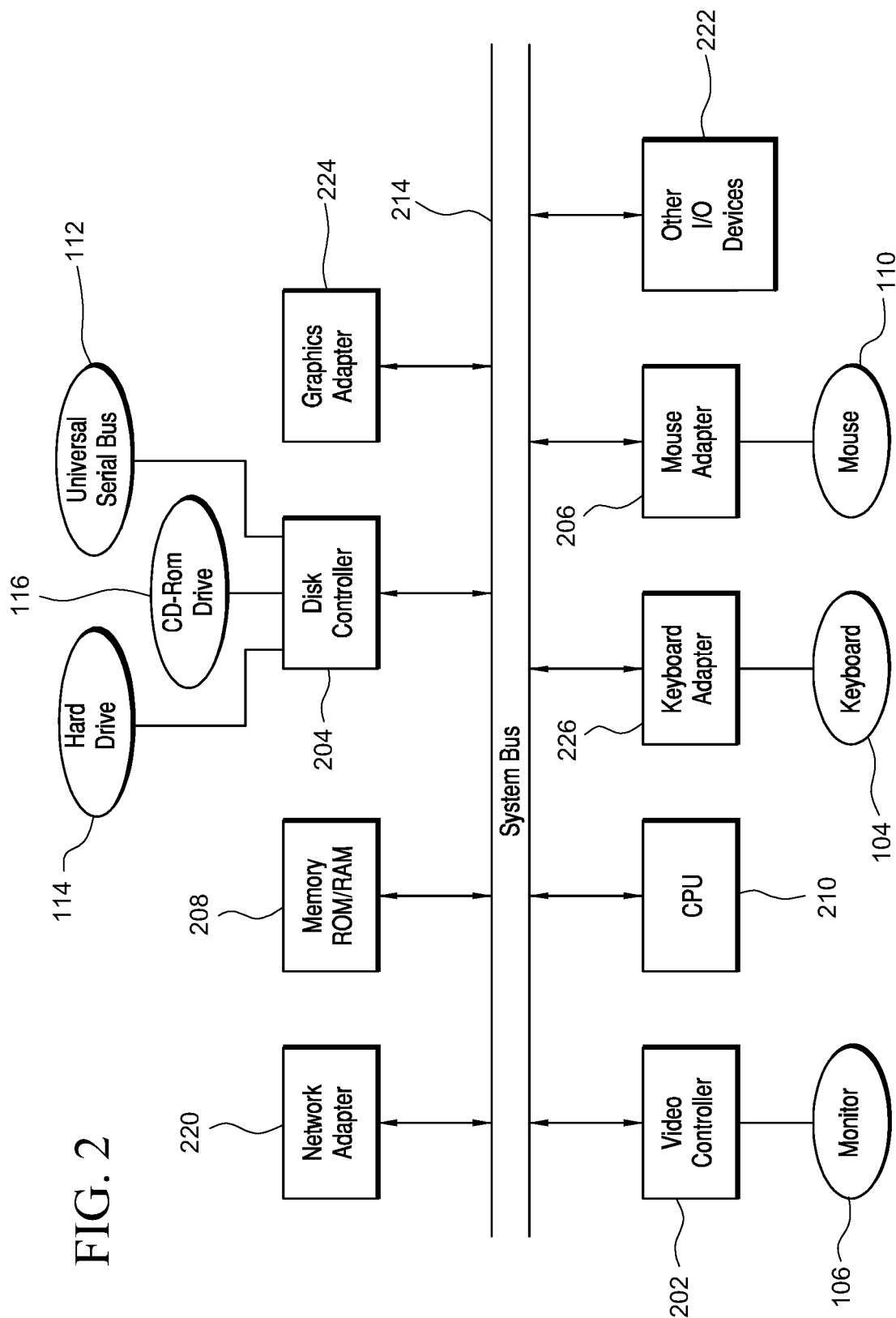
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112

(FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a

USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
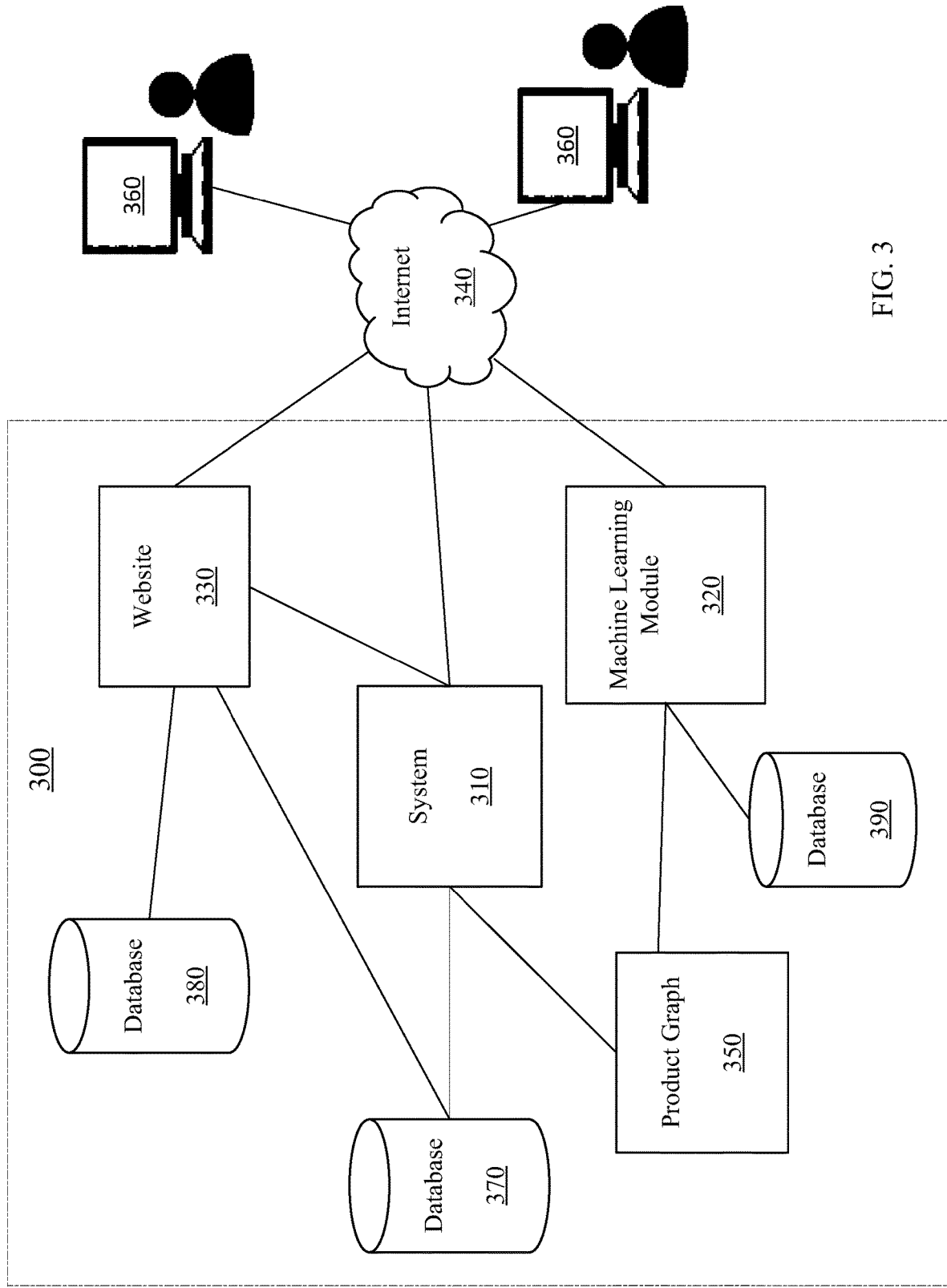
FIG. 3 illustrates a system for finding one or more substitutes for a requested product from the inventory database based on a product graph constructed by a machine learning module, according to an embodiment.

Turning ahead in the drawings, FIG. 3 illustrates a block diagram for a system 300, according to an embodiment. In many embodiments, system 300 comprises another system, such as system 310, a machine learning module, such as machine learning module 320, a website or a server hosting a website, such as website 330, a product graph, such as product graph 350, and one or more databases, such as databases 370, 380, and/or 390. In some embodiments, system 310 can be configured to determine one or more substitutes for a product based on a product graph, such as product graph 350, which is constructed by a machine learning module, such as machine learning module 320. Systems 300 and 310 are merely exemplary, and embodiments of systems 300 and 310 are not limited to the embodiments presented herein. Systems 300 and 310 can be employed in many different embodiments or examples not specifically depicted or described herein. In some embodiments, certain elements, modules, or systems of systems 300 and 310 can perform various procedures, processes, and/or activities. In other embodiments, the procedures, processes, and/or activities can be performed by other suitable elements, modules, or systems of systems 300 and 310. Systems 300 and 310 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of systems 300 and 310 described herein.

In this embodiment, internet 340 is coupled to system 300, system 310, machine learning module 320, website 330, and user devices 360; database 370 is coupled to system 310 and website 330; database 380 is coupled to website 330; database 390 is couple to machine learning module 320; and product graph 350 is coupled to system 310 and machine learning module 320. In many embodiments, system 300 and/or system 310 can be in data communication through internet 340 with one or more user computers, such as user devices 360. In some embodiments, user devices 360 can be used by users, which also can be referred to as customers. In some embodiments, system 300 and system 310 can be in data communication with user devices 360 through website 330 hosted by a web server that hosts one or more other websites. Accordingly, in embodiments where system 310 is in data communication with the user devices 360 through website 330, website 330 (and/or the software used by such systems) can refer to as a front end of system 310. In some embodiments, system 300 and/or system 310 can include website 330 configured to communicate with the user devices through Internet 330. In embodiments where system 300 and/or system 310 includes website 330, an internal network that is not open to the public can be used for communications between system 310 and website 330. In these or other embodiments, an operator and/or administrator of system 300 and/or system 310 can manage system 300, system 310, and/or website 330, the processor(s) of system 300, system 310, and/or website 330, and/or the memory storage unit(s) of system 300, system 310, and/or website 330 using the input device(s) and/or display device(s) of system 310 and/or website 330.

The overall system shown in FIG. 3 can comprise system 300, as well as internet 340, and one or more user devices 360. In many embodiments, system 300 and/or system 310 also can include machine learning module 320, website 330, product graph 350, and/or one or more databases 370, 380, and/or 390. System 300, system 310, machine learning module 320, and website 330 can each be a computer system, such as computer system 100 (FIG. 1), as described above, and can each be a single computer, a single server, or a cluster or collection of computers or servers, or a cloud of computers or servers. In other embodiments, a single computer system can host system 300/310, machine learning module 320, and website 330.

In certain embodiments, user devices 360 can be implemented with desktop computers, laptop computers, a mobile device, and/or other endpoint devices used by one or more users, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300, system 310, machine learning module 320, and/or website 330 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300, system 310, machine learning module 320, and/or website 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300, system 310, machine learning module 320, and/or website 330. In a similar manner, the processors and/or the non-transitory computer-readable media can be local and/or remote to each other.

Meanwhile, in many embodiments, system 300, system 310, machine learning module 320, and/or website 330 each also can be configured to communicate with and/or include one or more databases, such as databases 370, 380, and 390, and/or other suitable databases. The one or more databases can include an inventory database that contains information about logs, transactions, products, items, inventory statuses of products, or SKUs (stock keeping units), for example, among other data as described herein, such as described herein in further detail. The one or more databases can further include webpages of website 330. The one or more databases also can include product graph 350. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, system 310, machine learning module 320, website 330, and/or the one or more databases 370, 380, and 390 can be implemented using any suitable manner of wired and/or wireless communication. Accordingly, system 300, system 310, machine learning module 320, and/or website 330 can each include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
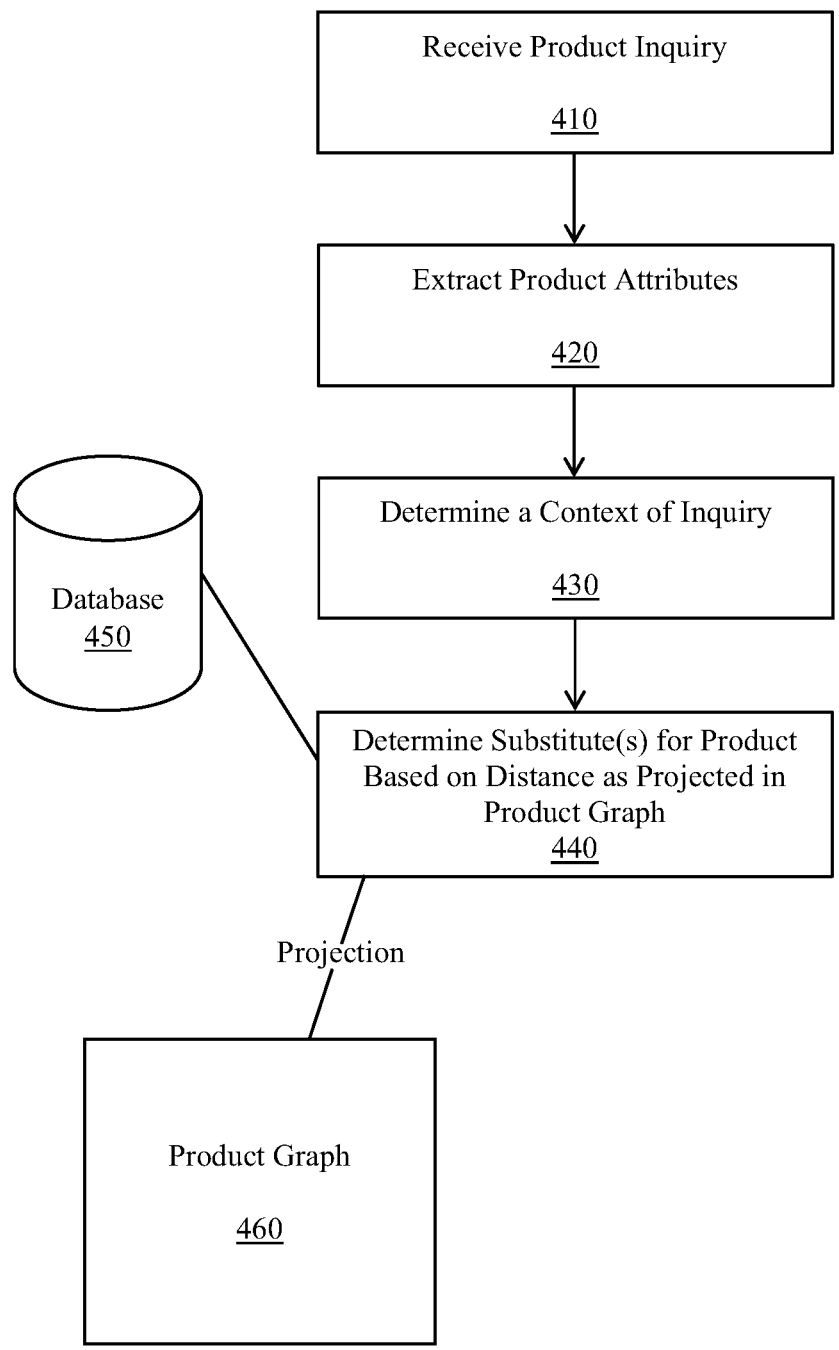
FIG. 4 illustrates a flow chart for a method for determining one or more substitutes for a requested product, according to another embodiment.

Turning ahead in the drawings, FIG. 4 illustrates a flow chart for a method 400.

In many embodiments, method 400 can be a method for determining one or more substitutes for a product described in a product inquiry. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 or 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 310 (FIG. 3). The processor(s) can be similar or identical to the processor(s) described above with respect to computer system 100 (FIG. 1).

In many embodiments, method 400 receives one or more product inquiries in block 410, extracts one or more attributes of each of the requested products in block 420, determines one or more contexts of the product inquiries in block 430, and determines one or more substitutions for each of the requested products in block 440 by projecting the requested products to a product graph 460 based on the attributes and the context. The product inquiries can come from one or more users through the Internet, and product graph 460, among other information, can be stored in database 450.

The product inquiries can include one or more textual descriptions of a requested product, such as the style, the color, the material, the price range, or the size of the requested product, or one or more images showing the product. In some embodiments, method 400 can include image processing capabilities, such as object detection or recognition based on various techniques and models, including Region-based Convolutional Neural Network (R-CNN) models, Single-Shot Detector (SSD) models, Neural Architecture Search Net (NASNet) models, You Only Look Once (YOLO) models, RetinaNet models, or any suitable technologies known in the art to detect the requested product. In other embodiments, method 400 can have the image of the product inquiry processed by an image processing module of a separate system. Image processing techniques, including object detection or recognition, are well known to those of ordinary skill in the art and accordingly, are not further discussed herein.

In many embodiments, once a product inquiry is received, method 400 can extract one or more attributes of a requested product in an inquiry in block 420. For example, in embodiments with image processing capabilities, based on a product inquiry that includes an image of a black leather loveseat, with striking lines and no apparent ornaments, in a living room with a lamp, a glass coffee table, hardwood floor, a white rug, a big window, and white walls, method 400 can determine that the requested product has one or more attributes, such as "black," "leather," "loveseat," and/ or "simple." In another example with a product inquiry of "blue dress for New Year Eve's party," method 400 can find or extract the attributes "blue" and "dress" from the product inquiry about the requested product.

In many embodiments, method 400 can determine a context of an inquiry in block 430. The context of the inquiry can include information that is in the inquiry but not directed attributed to the requested product and/or information that can be inferred from the expressly stated/shown elements of the inquiry. For instance, in the previous example of the loveseat, method 400 can identify, infer, or extract the environment of the product, the living room, and other items in the image, such as the lamp, the glass coffee table, the hardwood floor, the white rug, and the big window. Based on this information, method 400 can determine that the style the user may be interested is contemporary. Similarly, in the previous example of the dress, method 400 can find, infer, or extract the occasion from the inquiry, a New Year's Eve party, and determine that the style of the requested product can be luxe and/or shimmer.

The context of the inquiry also can include information about the user giving this inquiry, including the user's purchase history, such as the other products the user previously ordered, including the styles, the price range, the types of products purchased, and so forth. For example, if both of the exemplary inquiries above come from the same user, and the user previously ordered gray interior wall paint, a dining room table with industrial-style metal legs, a faux fur stool ottoman, and branded, logo-free apparels, all of which are at a higher price range, method 400 can determine, infer, or extract that the user's preferred style for home decor and furniture is urban, the preferred style for clothing is low-key luxury, and the preferred price range is at the higher end.

Additionally, in many embodiments, method 400 can determine the context of the inquiry based on information about the user based on the user's profile, such as the user's gender, age, home address, and so on. For example, method 400 can determine the same style of the requested product is different for users in different areas. For instance, a first group of consumers in the same geographic area with the first user may generally prefer some materials, patterns, colors, or surface treatments of a product while a second group of consumers in another geographic area with the second user may prefer different materials, patterns, colors, or surface treatments because of the different climate types, life styles, and/or tastes between these two groups of consumers. In many embodiments, with the attributes of the requested product and the context determined, method 400 can determine one or more substitutions for the requested product in block 440, by referring to a product graph 460.

After block 440, method 400 can transmit information regarding the one or more substitutions for the requested product to the user who transmitted the inquiry in block 410. The transmission can include facilitating a display of the information onto a graphical user interface on a screen of a device of the user. The device can be any of the devices described above with references to FIGS. 1 and 2, such as a desktop computer, a mobile smartphone, and the like.

Figure 5:
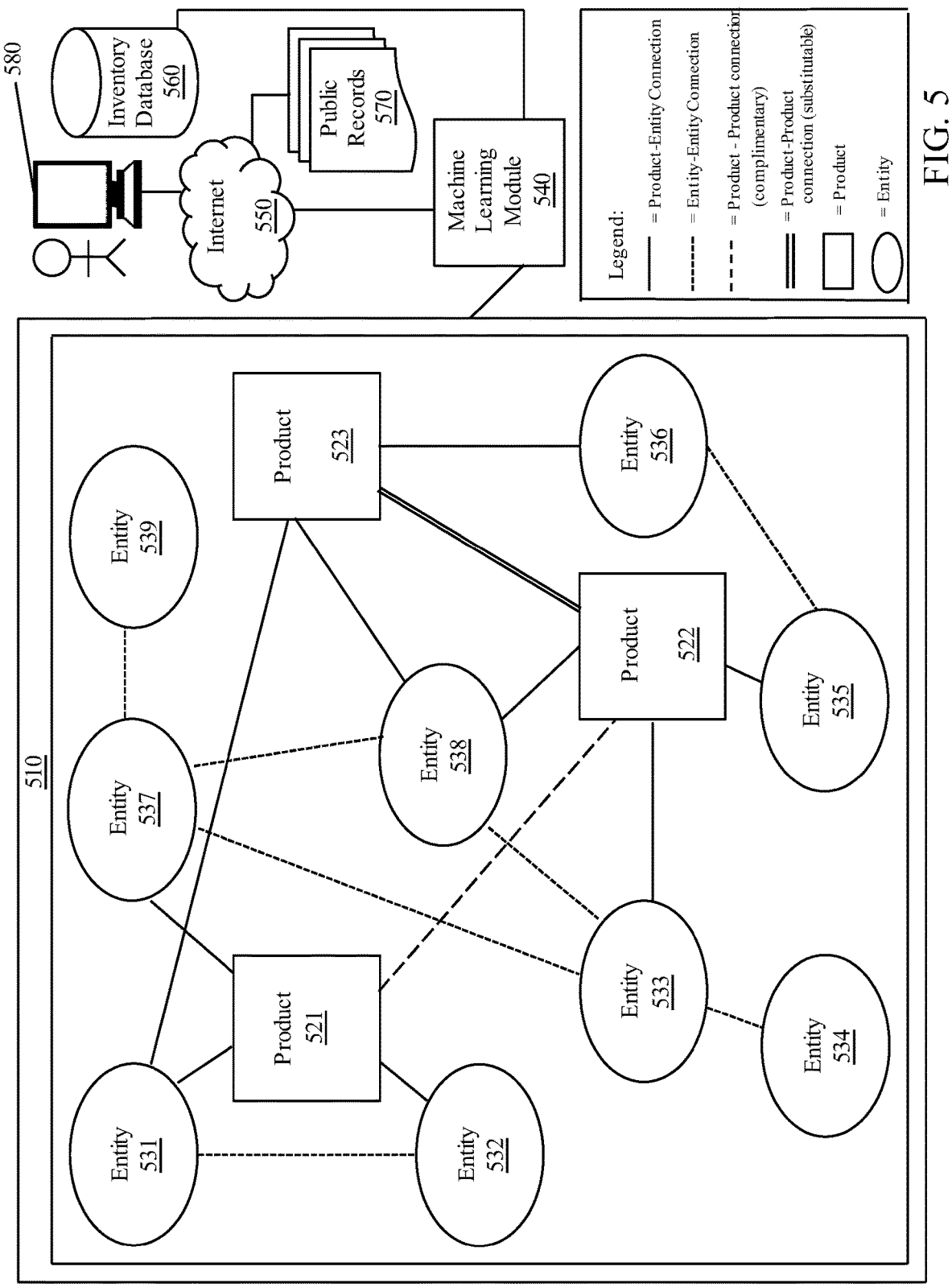
FIG. 5 illustrates a product graph showing products and entities as well as their relationships, according to another embodiment.

Turning ahead in the drawings, FIG. 5 illustrates product graph 510 and machine learning module 540, according to an embodiment 500. Product graph 510 and machine learning module 540 are merely exemplary and are not limited to the embodiments presented herein. Also, in many embodiments, product graph 510 can be similar to product graph 350 (FIG. 3) or 460 (FIG. 4), and machine learning module 540 can be similar to machine learning module 320 (FIG. 3). In many embodiments, product graph 510 includes two types of nodes: one or more products, such as products 521-523, and one or more entities, such as entities 531-539, as well as the relationships between one or more pairs of products and/or entities, called "connections," such as the various lines between the nodes in product graph 510. In some embodiments, the one or more connections of product graph 510 can include one or more "product-product connections," each representing a relationship between a single product and another product; one or more "entity-entity connections," each representing a relationship between a single entity and another entity; and/or one or more "product-entity connections," each representing a relationship between a single product and a single entity. In many embodiments, products 521-523 can be any goods and/or services that exist and entered by administrators and/or learned by machine learning module 540 from various sources of information, to be discussed below.

In many embodiments, entities 531-539 also can be entered by registered advanced users and/or learned by machine learning module 540. Exemplary entities can include a product type, such as seats, chairs, desks, wall decors, pants, shoes, earrings, eye shadows, video games, banking, real estate, and so on; a product function, such as to be sit upon, to protect the foot, to provide depositing or withdrawing funds, etc.; a brand; a price; or a product attribute, such as the sizes, prices, colors, materials, patterns, styles, weights, performances, consumer reviews, manufacturing information, including made in USA or not tested on animals, delivery limitations, including free shipping to US mainland addresses only, and so forth. In many embodiments, entities 531-539 also can include higher level product attributes, such as seasons; occasions including weddings, office parties, hiking, or work; intended environments including a living room, man cave, farm house, beach, park, indoor, or outdoor; and other features, including pet-friendly, organic, or using 100% recycled materials.

In many embodiments, the one or more connections of product graph 510 can each have a value representing the relatedness between the two nodes connected by the connection. In some embodiments, the one or more connections of product graph 510 can further include connections between every entity to itself and/or every product to itself. For example, in some embodiments, product graph 510 can include a product-product connection with a value of either substitutable or complementary, such as 0 for substitutable and 1 for complementary; an entity-entity connection between two different entity nodes with a fixed value, or a value in a range, such as from 0 to 10 or a weighted score; an entity-entity connection between the same entity node with a fixed value of 0; and/or a product-entity connection with a fixed value, or a value in a range, such as from 0 to 3 or a weighted score. Examples of one or more connections of product graph 510 in many embodiments can include a first product-product connection between an X-brand office chair and a Y-brand office chair with a value of substitutable; a second product-product connection between an X-brand office chair and a Z-brand office desk with a value of complementary; an entity-entity connection between the entities "red" and "orange" with a value of 1; and/or a product-entity connection between a product "$100 XYZ-brand red 9×12' rug" and each one of the entities "rug," xyz-brand," "red," "9×12'," and $100, each with a value of 0.

In many embodiments, machine learning module 540 is configured to build product graph 510 based on information about a certain domain. Examples of a domain include furniture and home decor, men's fashion, women's fashion, beauty products, electronic wearables, entertainment systems with related accessories, and so forth. In many embodiments, machine learning module 540 can be configured to learn the information about the domain from various sources, such as database 560, public records 570, and/or opinions of advanced users 580. In many embodiments, database 560 can be an inventory database of a retail store that contains information about logs, transactions, products, items, inventory statuses of products, or SKUs (stock keeping units) of the retail store's current and/or past inventory.

In many embodiments, public records 570 can include one or more records related to the domain and readily available to machine learning module 540, such as product catalogs, publications including magazines or newspaper articles, product reviews, blog entries, online discussion threads, search keywords, curated collections created by brands, retailers, and/or influencers including designers, hosts of pertinent TV shows, and celebrities, or purchase patterns of consumers in general. In many embodiments, one or more registered advanced users 580, such as one or more system administrators, sellers, brand representatives, designers, and/or curators, can be deemed experts in a domain and provide one or more expert opinions, through a user interface, to machine learning module 540, and the one or more expert opinions can include: which one or more products, entities, and/or connections should be added/removed/revised, and/or the distance value of each of the one or more connections. In some embodiments, an expert in a domain, such as an influencer, can register as an advanced user by an invitation while other experts, such as a brand representative, a retailer, and/or a system administrator, can become advanced users because of their account types.

In many embodiments, machine learning module 540 can be hosted by any suitable computer systems, such as one or more computer systems 100 (FIG. 1), and implemented by any one or more artificial intelligence (AI) models known in the art, such as deep learning networks, that are capable of dynamically learning information about the domain from various sources, including one or more expert opinions from one or more advanced users 580, the inventory database 560, and/or public records 570.

Figure 6:
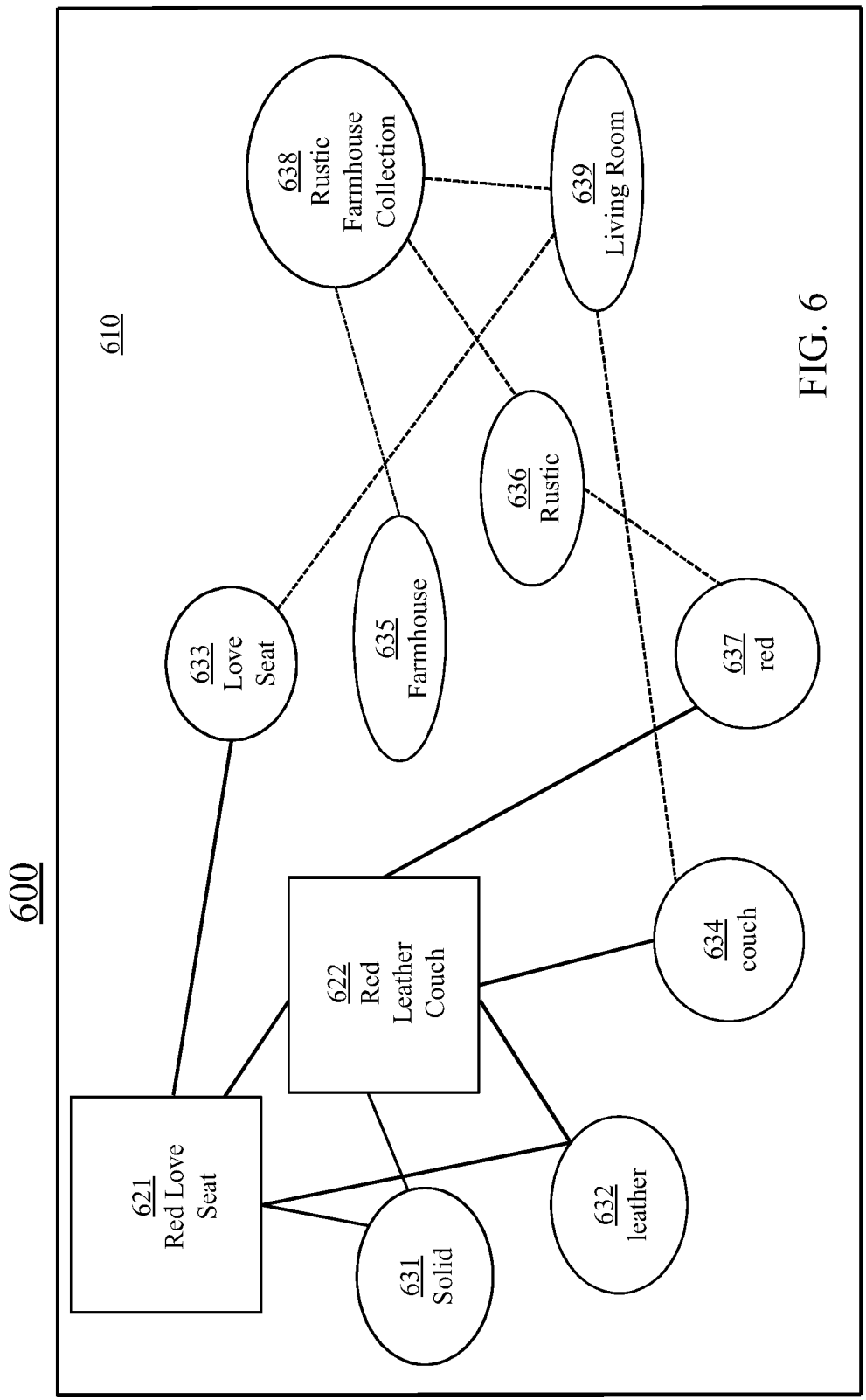
FIG. 6 illustrates a product graph showing products, entities, and the relationships thereof, according to another embodiment.

Turning ahead in the drawings, FIG. 6 illustrates product graph 610 according to another embodiment 600. In many embodiments, product graph 610 comprises one or more products, such as products 621-622, one or more entities, such as entities 631-639, one or more product-product connections, one or more entity-entity connections, and/or one or more product-entity connections. Product graph 610 is merely exemplary and is not limited to the embodiments presented herein.

Figure 7:
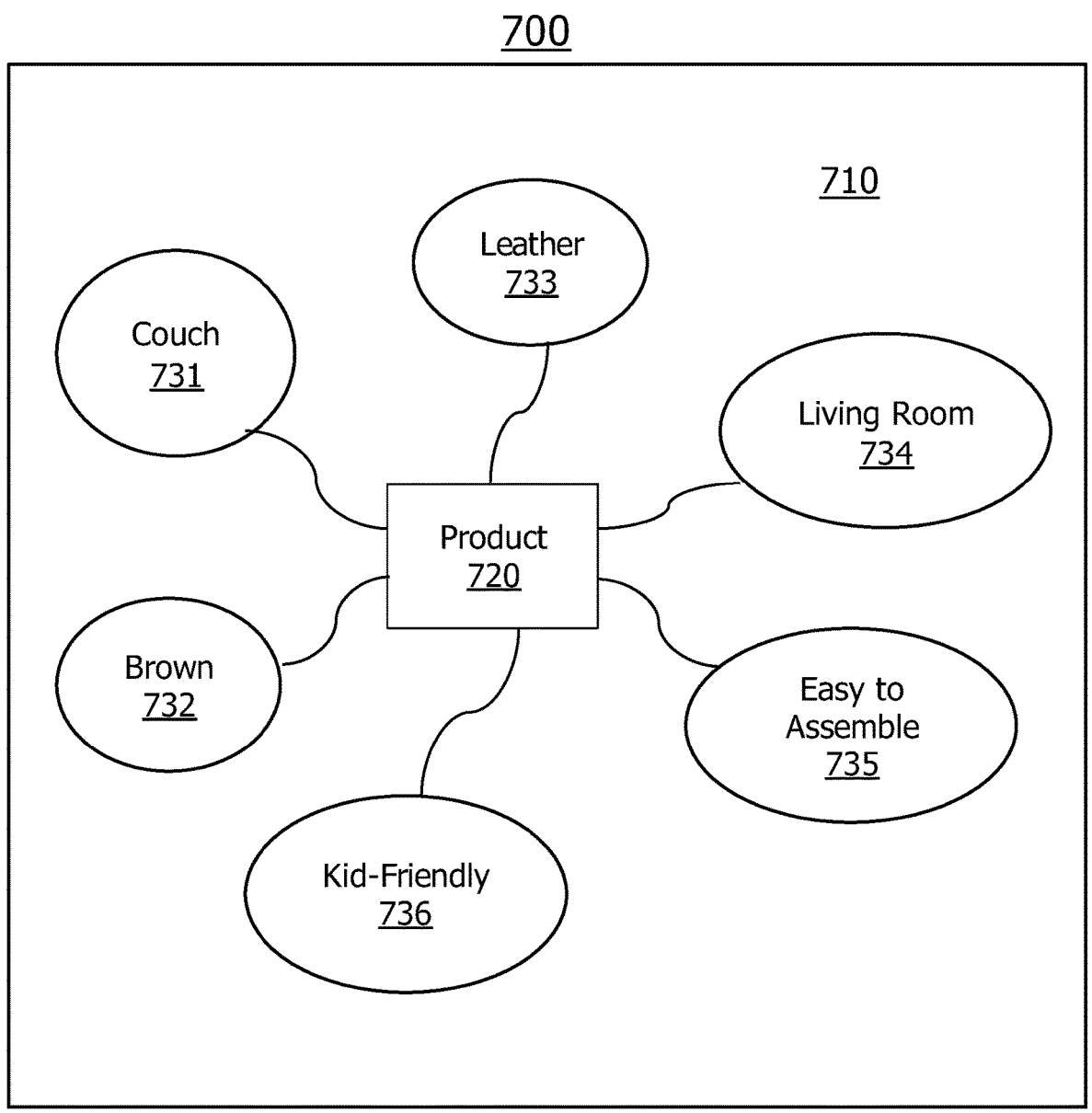
FIG. 7 illustrates a partial product graph showing a product and multiple entities related to the product, according to another embodiment.

Turning ahead in the drawings, FIG. 7 illustrates a partial product graph 710, according to another embodiment 700. Here, partial product graph 710 only shows a product, such as product 720, multiple entities, such as entities 731-736, and product-entity connections, with any entity-entity connections omitted. Partial product graph 710 is merely exemplary and is not limited to the embodiments presented herein.

Figure 8:
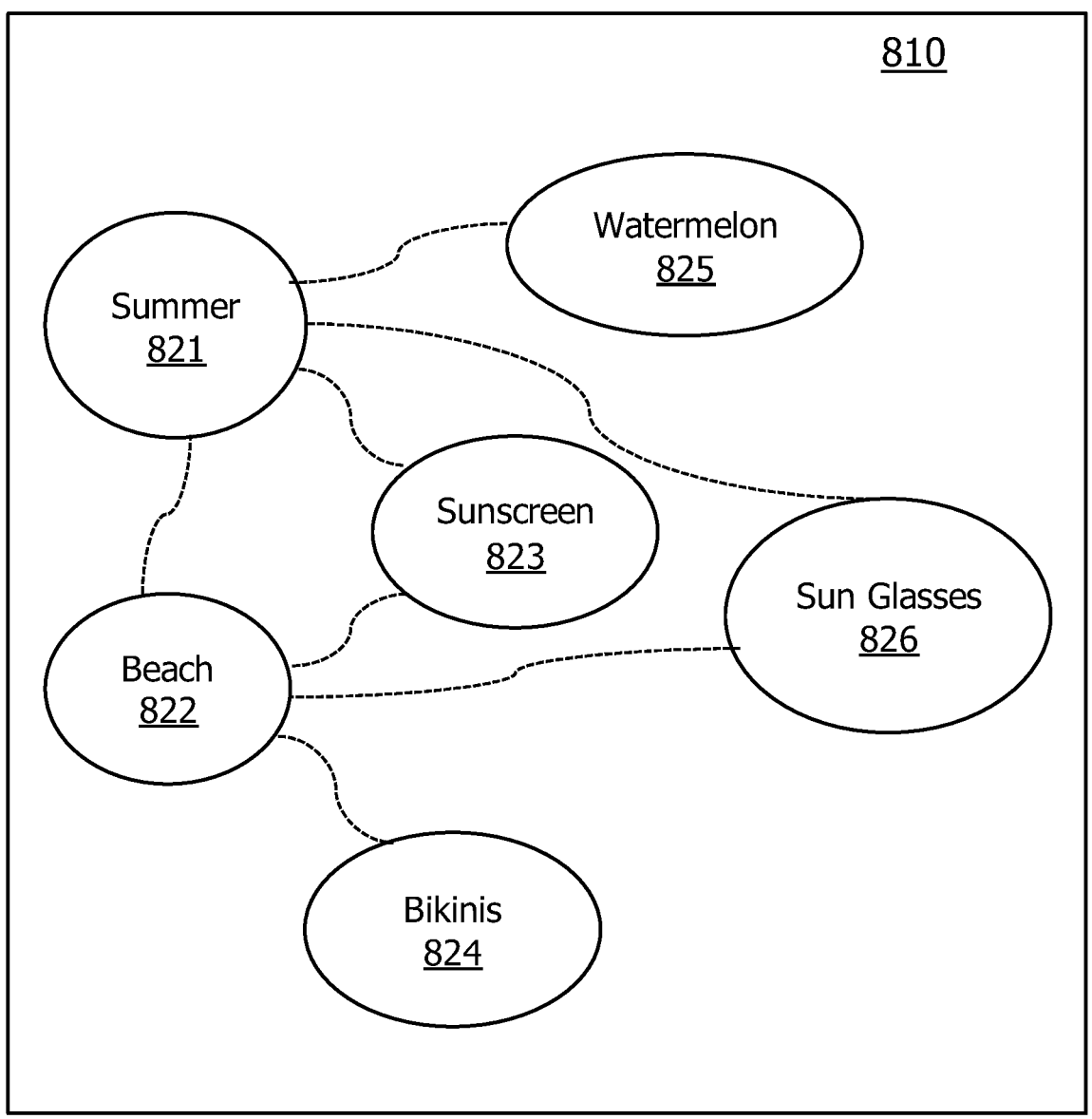
FIG. 8 illustrates a partial product graph showing multiple entities and the relationships, or no relationship, between them, according to another embodiment.

Turning ahead in the drawings, FIG. 8 illustrates a partial product graph 810, according to another embodiment 800. Partial product graph 810 includes a plurality of entities, such as entities 821-826, and multiple entity-entity connections. Partial product graph 810 is merely exemplary and is not limited to the embodiments presented herein.

Figure 9:
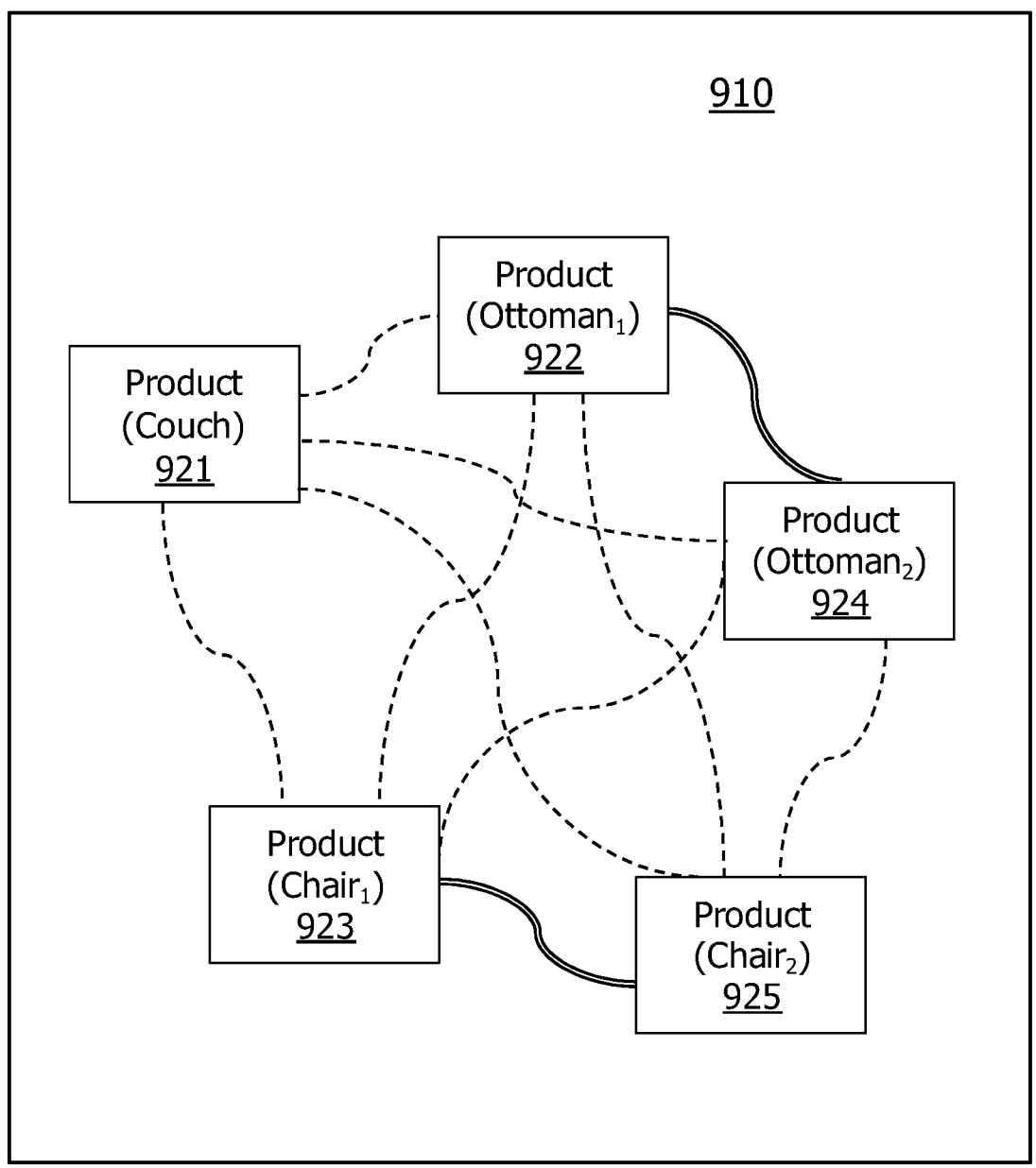
FIG. 9 illustrates a partial product graph showing multiple products, and the relationships, or no relationship, between them, according to another embodiment.

Turning ahead in the drawings, FIG. 9 illustrates a partial product graph 910, according to another embodiment 900. Partial product graph 910 includes a plurality of products, such as products 921-925, and multiple product-product connections, each with a value of either substitutable or complementary. Partial product graph 910 is merely exemplary and is not limited to the embodiments presented herein.

Figure 10:
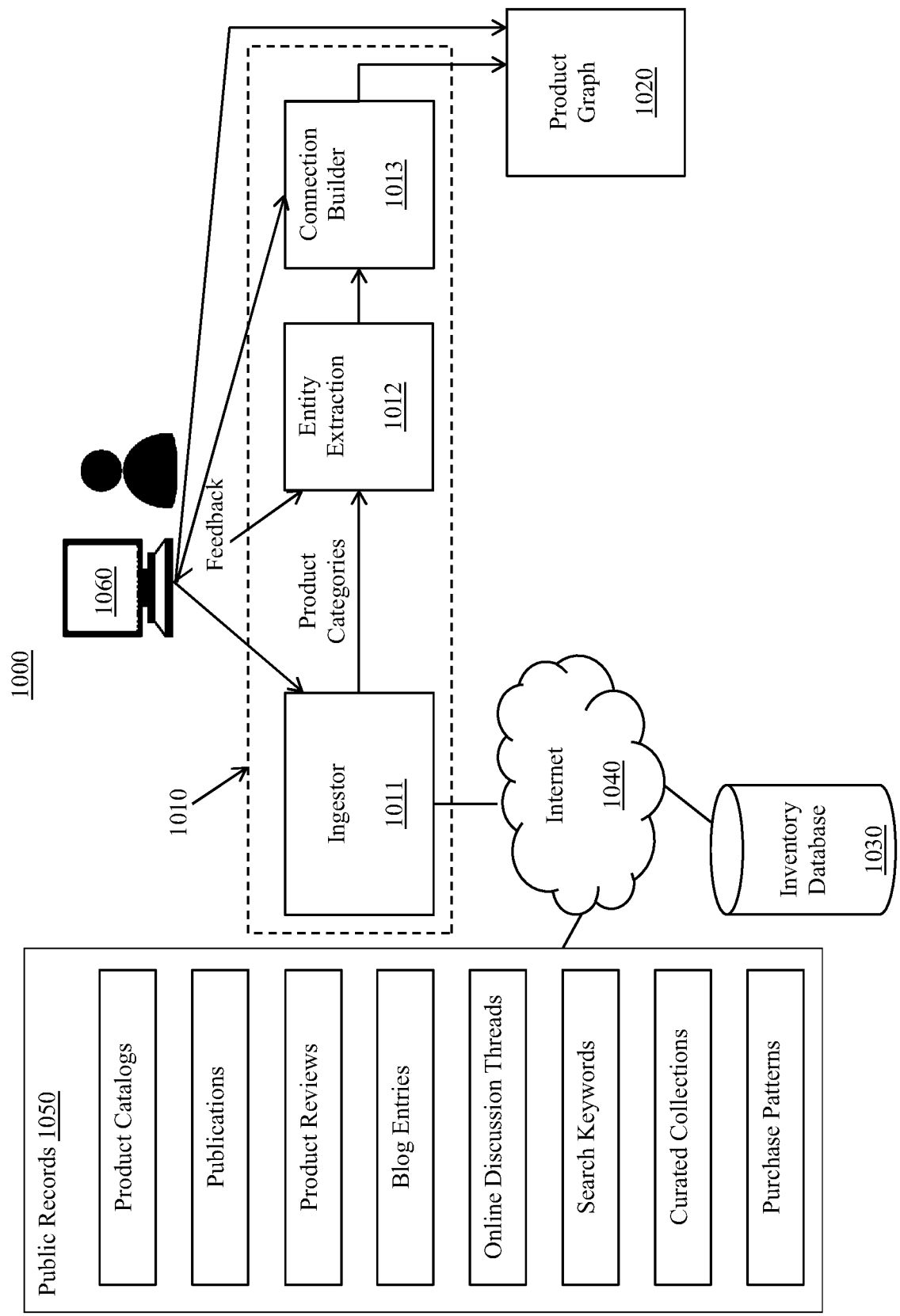
FIG. 10 illustrates a block diagram showing a machine learning module configured to construct a product graph of products, entities, and the relationships thereof, according to another embodiment.

Turning ahead in the drawings, FIG. 10 illustrates a block diagram of machine learning module 1010 for dynamically constructing a product graph 1020, according to another embodiment 1000. In many embodiments, machine learning module 1010 can include one or more category-generating submodules, such as ingestor 1011, one or more entity-extracting submodules, such as entity extractor 1012, and/or one or more connection-building submodules, such as connection builder 1013. In many embodiments, machine learning module 1010 can be configured to continuously update and optimize the product graph 1020. Machine learning module 1010, the submodules, including ingestor 1011, entity extractor 1012, and/or connection builder 1013, and product graph 1020 are merely exemplary and are not limited to the embodiments presented herein. Machine learning module 1010 can be employed in many different embodiments or examples not specifically depicted or described herein. Machine learning module 1010 can be similar to machine learning module 540 (FIG. 5) or machine learning module 320 (FIG. 3), and product graph 1020 can be similar to product graph 510 (FIG. 5), 350 (FIG. 3), or 460 (FIG. 4).

In some embodiments, certain elements, submodules, modules, or systems of machine learning module 1010 can perform various procedures, processes, and/or activities. In other embodiments, the procedures, processes, and/or activities can be performed by other suitable elements, submodules, modules, or systems of machine learning module 1010. Machine learning module 1010 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of machine learning module 1010 described herein.

In many embodiments, the one or more category-generating submodules of machine learning module 1010, such as ingestor 1011, are configured to dynamically create one or more product categories in the domain based on information about the domain, learned from various sources, including one or more databases, such as inventory database 1030, expert opinions, such as input from one or more advanced users 1060, and/or public records, such as the one or more product catalogs, publications, product reviews, blog entries, online discussion threads, search keywords, curated collections, and/or purchase patterns in public records 1050. Examples of criteria, that a category-generating module of machine learning module 1010 in some embodiments can use to create the product categories, can include the functions of all products in the domain, the types of the products, the colors of the products, the brands of the products, the origins of the products, salient features such as durability, washability, comfort level, and so forth.

In many embodiments, the one or more entity-extracting submodules, such as entity extractor 1012, are configured to dynamically extract one or more entity nodes from the one or more product categories based on the information machine learning module 1010 has obtained about the domain. In some embodiments, at least one of the one or more entity nodes is associated with a single one of a product type, a product function, a brand, a price, or a product attribute. For instance, entity extractor 1012 in an embodiment can conclude, based on the information about the domain, that the products grouped in a category based on the product type have many entities, such as their common product type—chairs, or more specifically office chairs; their functions including providing seats, armrests, and/or back support when sitting; the respective brands of the products, including Serta™, Mainstays™, etc.; the respective prices, or price ranges, of the products; and various attributes of the products, including sizes, colors, materials, components— backs, seats, arms, wheels/casters, and/or cushions, intended users, ergonomic, with or without adjustable heights, being comfortable or not, weight limits, requiring assembly or not, durable or not, good or poor quality, and so on. Based on these findings, entity extractor 1012 in this embodiment can create one or more entity nodes accordingly, such as "office chairs," "providing seat," "providing armrest when sitting," "providing back support when sitting," "Serta"™ "Mainstays"™, "0-$25," "$25-$50," "$50-$75," "black," "brown," "adult," "fabric," "leather," "mesh," "faux leather," "adjustable height," "high back," "mid back," "arms," "durable," "comfortable," etc.

In many embodiments, the one or more entity-extracting submodules, such as entity extractor 1012, can be further configured to create another one or more entity nodes based on the one or more entity nodes, each of the another one or more entity nodes being related to at least one of the one or more entity nodes according to a first set of criteria. In many embodiments, the product graph built by machine learning module 1010 includes a set of entity nodes comprising both the one or more entity nodes and the another one or more entity nodes.

An example of the first set of criteria for determining that a first entity node is related to a second entity node in an embodiment include whether the first entity node is linguistically similar to, or being a synonym or near-synonym for, the second entity node, such as entity nodes "red" vs. "scarlet," "comfortable" vs. "cozy," and "summer" vs. "summertime." In another embodiment, the first set of criteria can include whether the first entity node is linguistically opposite to, or being an antonym or near-antonym for, the second entity node, such as entity nodes "durable" vs. "delicate," "luxurious" vs. "poor," and "hard" vs. "soft." In yet another embodiment, the first set of criteria can include whether the first entity node is linguistically inferable from the second entity node, such as entity nodes "summer" vs. "bikini," "man cave" vs. "games," "Thanksgiving" vs. "fall," and "leather" vs. "luxurious."

In many embodiments, the one or more connection-building submodules, such as connection builder 1013, can be configured to dynamically build an entity-entity connection between each pair of entity nodes of the set of entity nodes, wherein the each pair of entity nodes are either associated with one of the one or more product categories or related to each other according to the first set of criteria. For example, in an embodiment where a first entity node "lace" and a second entity node "delicate" are both associated with more than one categories, including dresses, tops, and skirts, connection builder 1013 can be configured to determine that first entity node and the second entity node are related and create an entity-entity connection between them. In another embodiment where entity extractor 1012 creates a new entity node "cozy" because "cozy" is related to an existing entity node "comfortable" according to the first set of criteria, connection builder 1013 can be configured to create an entity-entity connection between the first entity node and the second entity node. In yet another embodiment, connection builder 1013 can be configured to apply the first set of criteria and create an entity-entity connection between the two entity nodes when these entity nodes are found related according to the first set of criteria.

In many embodiments, the one or more connection-building submodules, such as connection builder 1013, also can be configured to dynamically build a product-entity connection between an entity node of the set of entity nodes and a product node of a set of product nodes that is selected from the information about the domain and related to the entity node based on the information about the domain. As in embodiments elaborated above, the one or more connection-building submodules in these embodiments can find that a product node is related to an entity node based on the domain information learned from various sources. In some embodiments, a product node can be related to an entity node when connection builder 1013 finds that the product node inherently has the entity represented by the entity node. For instance, a product node for "Mickey Mouse™ red and white stripes cotton toddler boy socks" inherently includes at least entities "Mickey Mouse™" as its brand, "red" and "white" as its colors, "stripes" as its pattern, "cotton" as its material, "toddler" and "toddler boy" as its intended users, and "socks" as its product type, and connection builder 1013 in these and other embodiments can build product-entity connections between this product node and different entity nodes representing these different entities.

In addition, connection builder 1013 in some embodiments can be configured to build product-entity connections between a product node and each of one or more entity nodes when there are public records 1050, such as online reviews, discussion threads and/or articles, including one or more entities, represented by the one or more entity nodes, about this product, such as "cute," "comfortable," "4.5 stars out of 5," and/or "wash well" for the above mentioned socks; and "sparkling," "spectacular," and/or "beautiful" for "5-Light Glass Candle Chandelier." Furthermore, expert opinions from an advanced user, such as an online influencer, an interior designer, and/or a TV show host, that a specific product is included in his/her curated collection, such as a "2019 Curated Bedroom Collection," or this product is "classic" can be adopted by connection builder 1013 in some embodiments to create and/or update a product-entity connection.

In many embodiments, the one or more connection-building submodules, such as connection builder 1013, can be further configured to dynamically build a product-product connection between a first product node and a second product node selected from the set of product nodes when the first product node and the second product node are determined to be substitutable by or complimentary of each other based on the information about the domain. For instance, connection builder 1013 in an embodiment can determine that a first product node is substitutable to a second product node based on a list of substitutable products, including the second product node, for the first product node provide by a retailer's online website, a product review, and/or an expert opinion and create such a product-product connection accordingly.

Figure 11:
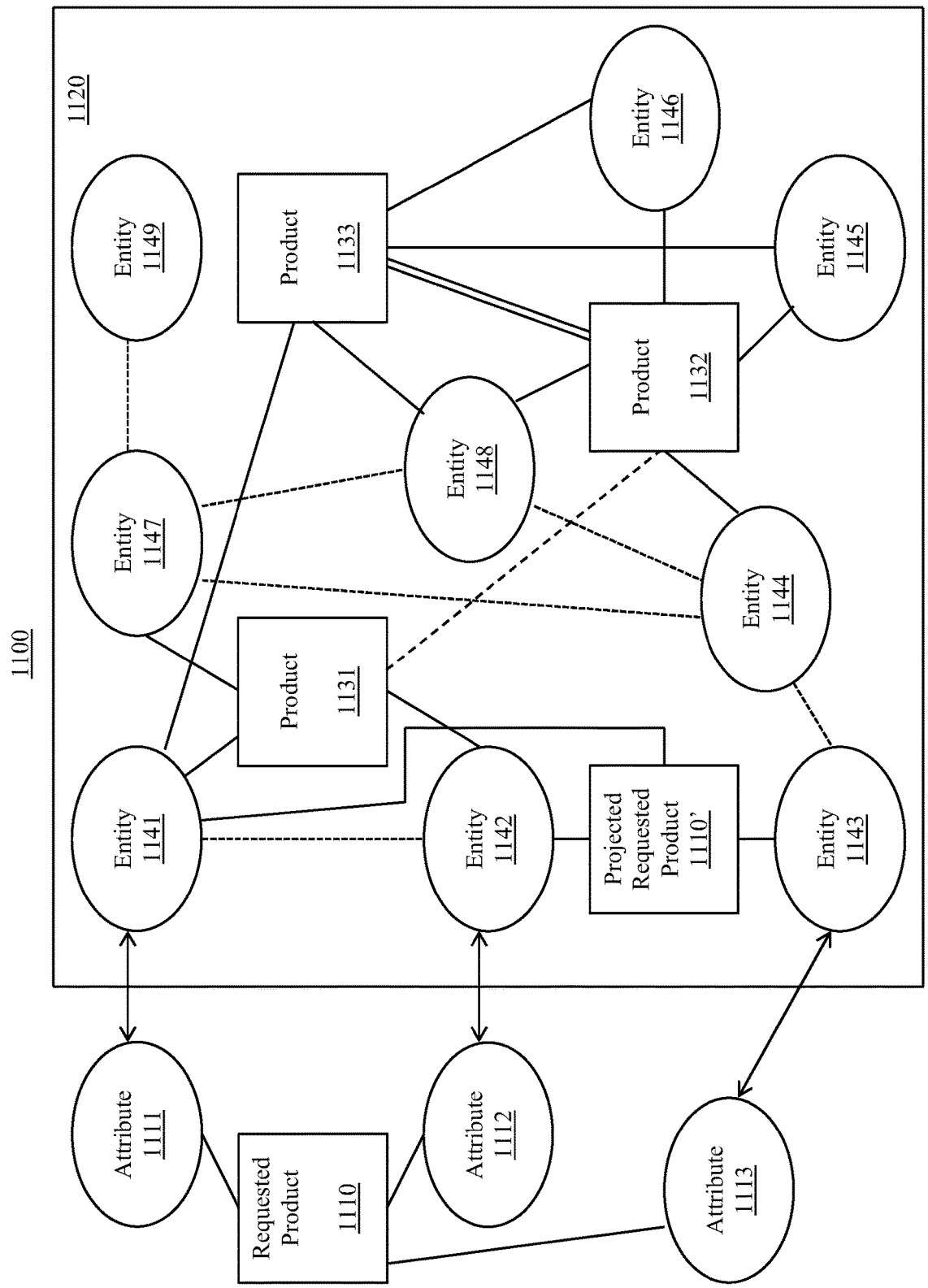
FIG. 11 illustrates a symbolic representation of a projection of a requested product to a product graph of products, entities, and the relationships thereof, according to another embodiment.

Turning ahead in the drawings, FIG. 11 illustrates a symbolic representation of the projection of a requested product 1110 to a projected requested product 1110' in a product graph 1120, according to an embodiment 1100. Requested product 1110, the projected requested product 1110', and product graph 1120 are merely exemplary and are not limited to the embodiments presented herein. The projection of requested product 1110 can be employed in many different embodiments or examples not specifically depicted or described herein.

Figure 12:
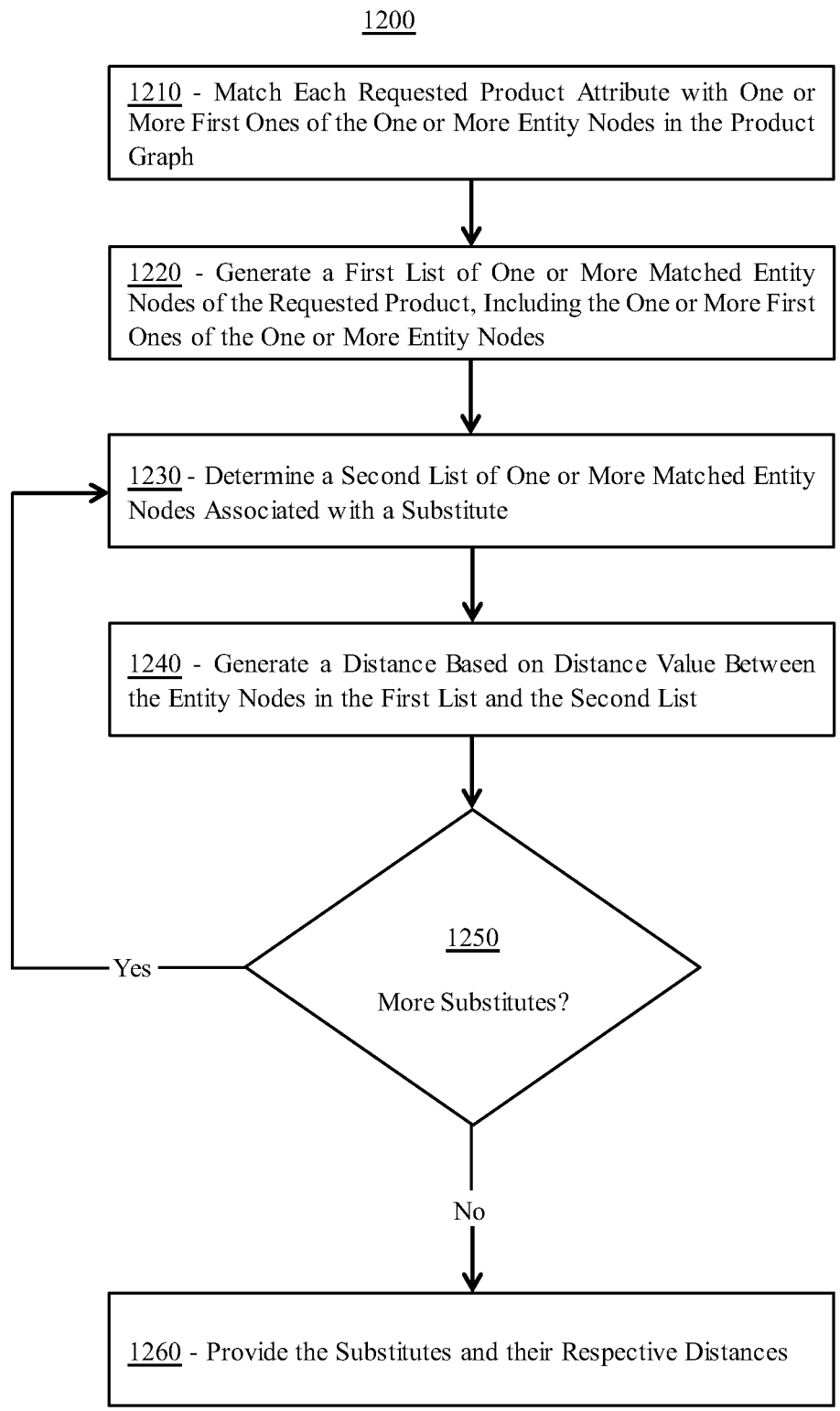
FIG. 12 illustrates a flow chart for a method for determining a distance of each substitute of one or more substitutes in a product graph for a requested product, according to another embodiment.

Turning ahead in the drawings, FIG. 12 illustrates a flow chart for a method 1200, in an embodiment. In many embodiments, method 1200 can be a method for determining a distance between each substitute of the one or more substitutes for a requested product, as projected in a product inquiry. Method 1200 is merely exemplary and is not limited to the embodiments presented herein. Method 1200 can be employed in many different embodiments or examples not specifically depicted or described herein. In some embodiments, the procedures, the processes, and/or the activities of method 1200 can be performed in the order presented. In other embodiments, the procedures, the processes, and/or the activities of method 1200 can be performed in any suitable order. In still other embodiments, one or more of the procedures, the processes, and/or the activities of method 1200 can be combined or skipped.

In many embodiments, method 1200 can be suitable to perform the projection of requested product 1110 (FIG. 11) to projected requested product 1110' (FIG. 11) in product graph 1120 (FIG. 11). In these or other embodiments, one or more of the activities of method 1200 can be implemented as one or more computing instructions configured to run at one or more processors and configured to be stored at one or more non-transitory computer readable media. Such non-transitory computer readable media can be part of a computer system such as system 300/310 (FIG. 3) and/or machine learning module 1010 (FIG. 10). The processor(s) can be similar or identical to the processor(s) described above with respect to computer system 100 (FIG. 1).

In many embodiments wherein machine learning module 1010 (FIG. 10) is configured to perform method 1200 to determine the projection of requested product 1010 (FIG. 11) to projected requested product 1110' (FIG. 11) in product graph 1120 (FIG. 11), machine learning module 1010 (FIG. 10) or connection builder 1013 (FIG. 10) can assign a distance value of each of the connections in product graph 1120 (FIG. 11), including each entity-entity connection, product-entity connection, and product-product connection.

In many embodiments, method 1200 can be configured to calculate the distance between the requested product, such as requested product 1010 (FIG. 11), and each substitute of the one or more substitutes, such as products 1131-1133 (FIG. 11), as projected in the product graph, such as projected requested product 1110' (FIG. 11) in product graph 1120 (FIG. 11), by one or more activities in Blocks 1210, 1220, 1230, 1240, 1250, and 1260. In some embodiments, method 1200 can be configured, in Block 1210, to match each requested product attribute of the one or more attributes of the requested product, such as product attribute 1111 (FIG. 11), with one or more first ones of the one or more entity nodes in the product graph, such as entity 1141 (FIG. 11).

In some embodiments, method 1200 can incorporate contextual attributes into the one or more attributes of the requested product in Block 1210 when matching each of the one or more attributes of the requested product with one or more first ones of the one or more entity nodes in the product graph. In an exemplary embodiment, Block 1210 can determine that the requested product attributes of a requested product in an inquiry for "men's attire for a formal business meeting" include "men's," "suit," "jacket," "trousers," "tie," and "shoes" as the attributes directly associated with the requested product and "formal," "business," "meeting," and "navy blue," "black," "brown," or "gray" as the contextual attributes of the requested product. In other embodiments, method 1200 can consider the context for determining the substitutes at a later stage, such as by filtering out certain substitutes from the list of proposed substitutes or altering the distances using the contextual attributes as criteria in a conventional search. In another embodiment, method 1200 can determine the distance in the product graph between the projected product node and each substitute based on the one or more entities matching the product's one or more attributes, and then re-perform some or all of the activities using another projected product node with the contextual attributes and combine these two sets of results.

In many embodiments, method 1200 can be configured, in Block 1220, to generating a first list of one or more matched entity nodes associated with the requested product, such as entity 1141-1143 (FIG. 11), the one or more matched entity nodes including the one or more first ones of the one or more entity nodes in the product graph matched for the each requested product attribute.

In many embodiments, method 1200 can be configured, in Block 1230, to determine a second list of one or more matched entity nodes associated with a substitute of the one or more substitutes. The way the one or more substitutes are found may vary from one embodiment to another. In many embodiments, as the substitutes are originally retrieved from an inventory database, which can be a source of information about the domain, the substitutes at this stage are already integrated in the product graph and have corresponding product nodes. As such, as long as the substitutes can be found in the product graph, the one or more matched entity nodes associated with the substitute also can be obtained from the product graph.

In many embodiments, method 1200 can be configured, in Block 1240, to generate the distance between the projected requested product and the substitute based on a distance value of a path in the product graph between a first node selected from the first list of one or more matched entity nodes and a second node selected from the second list of one or more matched entity nodes, the path comprising one or more entity-entity connections linking the first node and the second node in the product graph. In many embodiments, a product graph can be a multi-dimensional space, such as an N-dimensional space, and every product node is created with a coordinate, such as a Cartesian coordinate, in the product graph based on the distance value between the product node and every entity node of the N entity nodes, i.e. the axes, in the product graph. In such embodiments, every entity node, including the N entity nodes that form the axes in the N-dimensional space of the product graph, has a coordinate as well. Here, method 1200 can be configured to determine the distance between the projected requested product (R) and a substitute (S) based on the Pythagorean formula. For instance, if R=(r1, r2, . . . rN) and S=(s1, s2, . . . , sN) in Cartesian coordinates, the distance between R and S is:

$$d(R,S)=d(S,R)=\sqrt{\Sigma_{i=1}^{N}(si-ri)^2}$$

Here, ri is the projection of R on the $i^{th}$ dimension of the product graph, also the product-entity connection between R and the $i^{th}$-entity-node (Ei), in the first list of the one or more matched entity nodes. Similarly, si is the projection of S on the $i^{th}$ dimension of the product graph, also the product-entity connection between S and Ei in the second list of the one or more matched entity nodes. (si-ri) represents a vector representing the shortest path between the $i^{th}$ entity nodes from the first and the second lists of the one or more matched entity nodes.

In other embodiments where not every product node in the product graph is connected directly to every entity node, a product graph can be a different multi-dimensional space, such as an M-dimensional space, not based on entity nodes, and each of the limited number (N) of entity nodes in the product graph has a coordinate, such as a Cartesian coordinate E=($e_1, e_2, e_3, \ldots, e_M$), in the product graph. Each of the product nodes in this product graph has a coordinate that comprises the combination of, or be the center of mass among, the entity nodes associated with the each of the product nodes, such as P=$\Sigma_{i=1}^{N}$ d(P, Ei)*Ei, where N is the number of entity nodes associated with product node P and d(P, Ei) is the distance value of the product-entity connection between P and the $i^{th}$ associated entity node. With the coordinates of the projected requested product and the substitutes known, method 1200 can determine the distance between them, using a formula, such as the Pythagorean formula above.

In these or other embodiments, method 1200 also can calculate the distance between a projected requested product, such as projected requested product 1110' (FIG. 11), and the substitute, such as product 1131 (FIG. 11), based on the shortest path(s) between their associated entity nodes. In some embodiments, method 1200 can determine that the distance, e.g., d(R, S), between a projected requested product, such as projected requested product 1110' (FIG. 11) and a substitute, such as product 1131 (FIG. 11) in the product graph, such as product graph 1120 (FIG. 11), can be a function, such as an average, of the distance value of the shortest path among the one or more entity-entity connections linking a first node selected from the first list of one or more matched entity nodes and a second node selected from the second list of one or more matched entity nodes.

In many embodiments, after the distance of the substitute is determined in Block 1240, method 1200 can determine, in Block 1250, whether there is a next substitute of the one or more substitutes that has an undetermined distance. If there is such a next substitute, method 1200 in these or other embodiments can repeat the activities in Blocks 1230 and 1240 for the next substitute until the distance of every substitute of the one or more substitutes is determined. In many embodiments, once method 1200 finds that each of the one or more substitutes has a determined distance, method 1200 can provide, in Block 1260, the one or more substitutes and their respective distances to the user device of the user who submitted the inquiry with the requested product.

In many embodiments, method 1200 can further include additional activities, or the activities can be performed in various feasible orders. In some embodiments, the substitutes can be pre-scanned in order to save time for considering product nodes that are too far from the projected requested product in the product graph. For instance, in an embodiment, a product graph can be a multi-dimensional space, such as an N-dimensional space, and every product node is created with a coordinate, such as a Cartesian coordinate, in the product graph, and Block 1230 can locate all product nodes within a predetermined range in the multi-dimensional space, i.e., having distances less than a predetermined value. In alternate embodiments, Block 1230 can start from the projected product node and explore the product graph by scanning the product nodes nearby so that only the nearest K product nodes in the product graph are considered as substitutes, K being a predetermined threshold, such as 10, 15, 20, or 30.

In other embodiments, Block 1230 can consider every product node in the product graph as a substitute, and for each product node in the product graph, each entity node connected to the product node is to be included in the second list of one or more matched entity nodes for this product node, such as entities 1141, 1142, and 1147 (FIG. 11) being in the second list of the one or more matched entity nodes for product 1131 (FIG. 11), entities 1144, 1145, and 1148 (FIG. 11) in the second list of the one or more matched entity nodes for product 1132 (FIG. 11), and entities 141, 1146, and 1148 (FIG. 11) for product 1133 (FIG. 11). In other embodiments, in order to reduce the number of potential substitutes for comparison, Block 1230 can be further configured to use only the one or more product nodes in the product graph that share at least one directly-connected entity node with the projected requested product as the one or more substitutes, such as products 1131 & 1133 (FIG. 11) that share entities 1141 and/or 1142 with the projected requested product 1110', but not product 1132 (FIG. 11). In alternate embodiments, Block 1230 can relax the requirement of sharing at least one connected entity node and allow some entity-entity connections between (a) one or more entity nodes connected with the projected product node and (b) the one or more entity nodes connected with a substitute.

Furthermore, in an embodiment, when one of the one or more substitutes is a missing substitute that does not exist in the product graph, such as when machine learning module 1010 (FIG. 10) has yet to learn the information about the missing substitute which can be a new product in the inventory database 1030 (FIG. 10), method 1200 can provide the missing substitute for machine learning module 1010 (FIG. 10) to learn from and update the product graph, including creating a new product node in product graph 1020 (FIG. 10), potentially learning new attributes and creating new entities according, and building one or more new connections for the new product node.

In an alternate embodiment, when method 1200 finds a missing substitute from a product graph, without waiting for a machine learning module to update the product graph, method 1200 can determine a projected substitute product node by extracting one or more attributes of the missing substitute; matching each substitute attribute of the one or more attributes of the missing substitute with one or more second ones of the one or more entity nodes in the product graph; and generate the second list of one or more matched entity nodes based on the matching the each substitute attribute with the missing substitute.

Figure 13:
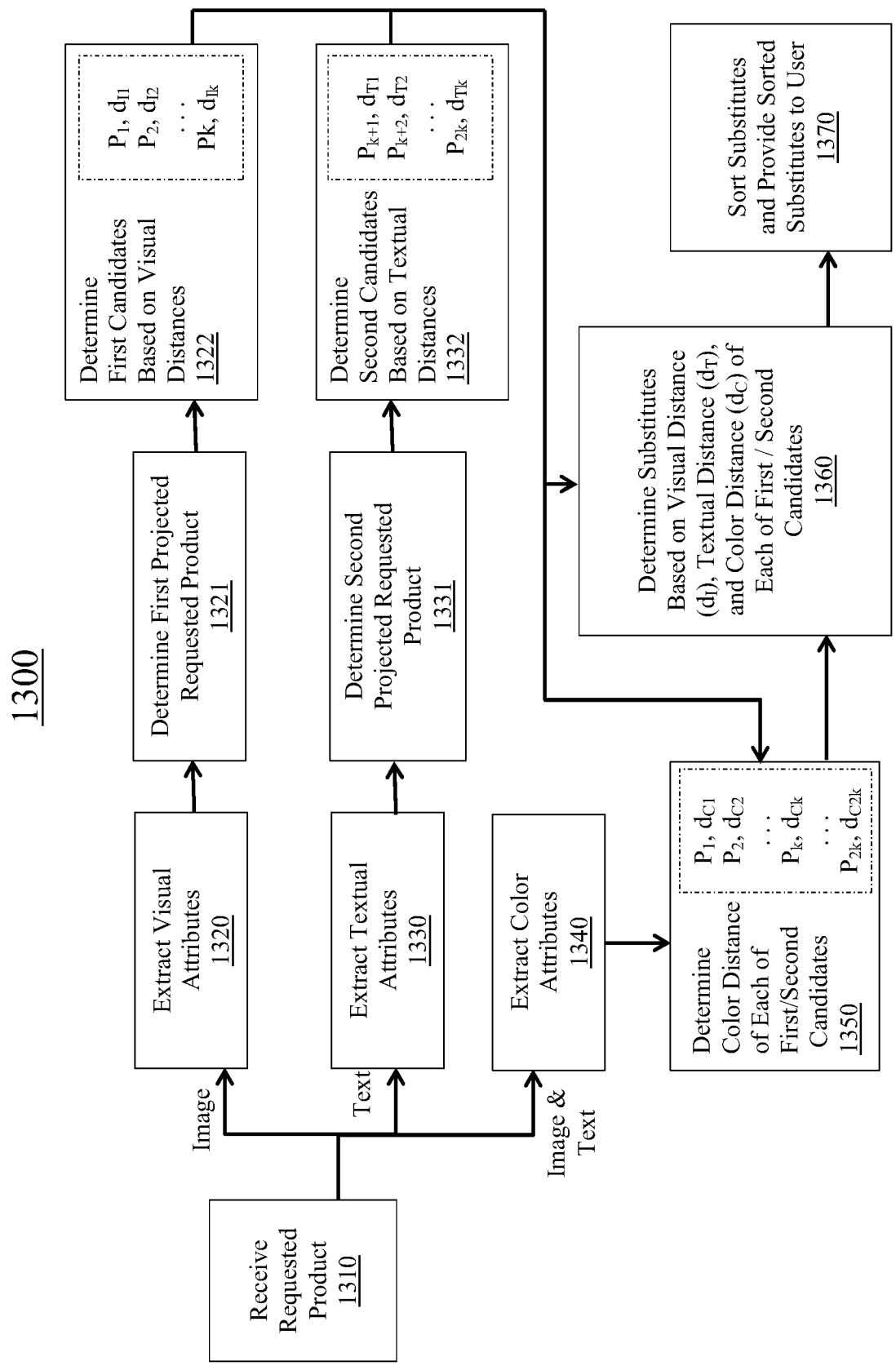
FIG. 13 illustrates a flow chart for a method for providing one or more substitutes for a requested product, after the one or more substitutes sorted based on a score of similarity, according to another embodiment.

Turning ahead in the drawings, FIG. 13 illustrates a flow chart for a method, according to another embodiment. In many embodiments, method 1300 can be a method implemented via execution of computing instructions configured to run at one or more processors and stored at one or more non-transitory computer-readable media, and the computing instructions can be configured to determine and provide one or more substitutes for a requested product based on rankings of similarity. Method 1300 is merely exemplary and is not limited to the embodiments presented herein. Method 1300 can be employed in many different embodiments or examples not specifically depicted or described herein. In some embodiments, the procedures, the processes, and/or the activities of method 1300 can be performed in the order presented. In other embodiments, the procedures, the processes, and/or the activities of method 1300 can be performed in any suitable order. In still other embodiments, one or more of the procedures, the processes, and/or the activities of method 1300 can be combined or skipped.

In many embodiments, one or more of the activities of method 1300 can be implemented as one or more computing instructions configured to run at one or more processors and configured to be stored at one or more non-transitory computer readable media. Such non-transitory computer readable media can be part of a computer system such as system 300/310 (FIG. 3) and/or machine learning module 1010 (FIG. 10). The processor(s) can be similar or identical to the processor(s) described above with respect to computer system 100 (FIG. 1).

In many embodiments, method 1300 can receive an inquiry from a user in Block 1310, and the inquiry can comprise an image and/or a text describing a requested product. In many embodiments, when the inquiry includes an image for describing the requested product, method 1300 can extract one or more visual attributes of the requested product based on the image in Block 1320, by any suitable software or hardware for processing images and/or identifying objects and features in the images. Examples of visual attributes can include any information that can be determined in the image, such as colors, materials, styles, etc. In these and other embodiments, after the one or more visual attributes are determined, method 1300 can then determine, in Block 1321, a first projected requested product, in a product graph, such as product graph 510 (FIG. 5) or product graph 610 (FIG. 6), relating to a domain of the requested product, based on the one or more visual attributes of the requested product.

In many embodiments, the product graph can be dynamically generated by a machine learning module, such as machine learning module 1010 (FIG. 10), based on information about the domain of the requested product. In many embodiments, the product graph can comprise: (a) one or more product nodes, the one or more product nodes comprising the one or more substitutes; (b) one or more entity nodes, the one or more entity nodes comprising the one or more visual attributes and the one or more textual attributes of the requested product; (c) one or more entity-entity connections between each pair of related entity nodes of the one or more entity nodes; (d) one or more product-entity connections between a product node of the one or more product nodes and an entity node of the one or more entity nodes, wherein the entity node is related to the product node; and (e) one or more product-product connection between a first product node of the one or more product nodes and a second product node of the one or more product nodes, wherein the first product node and the second product node are determined to be substitutable by or complimentary of each other.

In many embodiments, after a first projected requested product is determined, method 1300 can determine, in Block 1322, one or more first candidates based on the visual distances between the one or more first candidates and the first projected requested product. In many embodiments where the product graph comprises one or more products that do not exist in an inventory database, such as database 370 (FIG. 3), database 450 (FIG. 3), inventory database 560 (FIG. 5), or inventory database 1030 (FIG. 10), of a retailer using method 1300, method 1300 can further determine that only product nodes in the product graph that also exist in the inventory database of the retailer are included in the one or more first candidates. In some embodiments, the one or more first candidates can comprise the first K product nodes in the product nodes that are closest to the first projected requested product in the product graph, wherein K is a predetermined number, such as 20, 100, etc. In other embodiments, the one or more first candidates can comprise one or more product nodes in the product graph with visual distances within a predetermined threshold, such as 0.002, 0.0015, 0.001, etc.

In many embodiments, when the inquiry from Block 1310 includes text for describing the requested product, method 1300 can extract one or more textual attributes of the requested product based on the text in Block 1330, by any suitable software or hardware for parsing and interpreting the text in the inquiry. Examples of textual attributes of the requested product can include any information that can be determined from the text, such as price ranges, brands, colors, materials, styles, etc. In these and other embodiments, after the one or more textual attributes are determined, method 1300 can then determine, in Block 1331, a second projected requested product in the product graph based on the one or more textual attributes of the requested product. In many embodiments, after a second projected requested product is determined, method 1300 can determine, in Block 1332, one or more second candidates based on the textual distances between the second candidates and the second projected requested product. In many embodiments where the product graph comprises one or more products that do not exist in an inventory database, such as database 370 (FIG. 3), database 450 (FIG. 3), or inventory database 560 (FIG. 5), of a retailer using method 1300, method 1300 can further determine that only product nodes in the product graph that also exist in the inventory database of the retailer are included in the one or more second candidates. In some embodiments, the one or more second candidates can comprise the first N product nodes that are closest to the second projected requested product in the product graph, wherein N is a predetermined number, such as 50, 100, etc. In other embodiments, the one or more second candidates can comprise the product nodes with textual distances within a predetermined threshold, such as 0.002, 0.0015, 0.001, etc. In some embodiments, such as this embodiment in FIG. 13, the predetermined number of the one or more first candidates and the predetermined number of the one or more second candidates can be the same.

In many embodiments, when the inquiry from Block 1310 expressly or implicitly includes color for describing the requested product, method 1300 also can extract one or more color attributes of the requested product based on the image and the text in Block 1340, and then determine a color distance of each of a group comprising the one or more first candidates and the one or more second candidates in Block 1350. In many embodiments, method 1300 can determine the color distance of a candidate of the group comprising the one or more first candidates and the one or more second candidates based on the one or more color attributes of the requested product and one or more color entities of the candidate. In some embodiments, the one or more color attributes of the requested product can comprise a product major color and a product minor color; the one or more color entities of the candidate of the group comprising the one or more first candidates and the one or more second candidates can comprise a candidate major color and a candidate minor color as well; and the color distance of a candidate of the group can comprise a major color distance and a minor color distance.

In many embodiment, method 1300 can determine, in Block 1360, a score of the candidate of the group comprising the one or more first candidates and the one or more second candidates based on the visual distance, the textual distance, and/or the color distance of the candidate; and then determine the substitutes, selected from the group, to be presented to the user providing the inquiry that comprises the image and/or text describing the requested product. In some embodiments, when method 1300 determines the score of the candidate based on the visual distance, the textual distance, and/or the color distance of the candidate, method 1300 can give different weights to the visual distance, the textual distance, and/or the color distance of the candidate, such as 2 for the visual distance, 1 for the textual distance, and 3 for the color distance, for example.

In some embodiments where the one or more color attributes of the requested product comprises a product major color and a product minor color, and where the one or more color entities of the candidate of the group comprising the one or more first candidates and the one or more second candidates comprise a candidate major color and a candidate minor color, the score of the candidate substitute of the one or more substitutes can be determined by:

$$\alpha_I \frac{1}{d_I} + \beta_C \left( \frac{1}{d_{maj-c}} + \frac{1}{d_{min-c}} \right) + \gamma_T \frac{1}{d_T};$$

wherein:
$d_I$: the visual distance between the first projected requested product and the candidate;
$d_t$: the textual distance between the second projected requested product and the candidate;
$d_{maj-c}$: a major color distance between the product major color and the candidate major color;
$d_{min-c}$: a minor color distance between the product minor color and the candidate minor color;
$\alpha_1$: a predetermined image weight, such as 0.01;
$\beta_C$: a predetermined color weight, such as 0.005; and
$\gamma_T$: a predetermined text weight, such as 0.0025.

In many embodiments, method 1300 can include the entire group comprising the one or more first candidates and the one or more second candidates into one or more substitutes in Block 1360. In some embodiments, method 1300 can select one or more substitutes from the group based on a minimum threshold of the scores of the candidates of the group, such as 0.5 or 0.01, etc., in Block 1360. In some embodiments, method 1300 can select the substitutes from the group based on the scores of the candidates of the group and a maximum number of the substitutes to be provided to the user, such as 10, 20, or 100, in Block 1360.

In many embodiments, once the one or more substitutes are determined, method 1300 can then sort the one or more substitutes based on the scores of the one or more substitutes and automatically transmit to the user the one or more substitutes in a descending order based on the scores in Block 1370. In some embodiments where the one or more substitutes comprises the one or more first candidates and the one or more second candidates before sorting, method 1300 can automatically transmit to the user only the higher ranked ones of the one or more substitutes in Block 1370. In these and other embodiments, the higher ranked ones of the one or more substitutes to be transmitted to the user can be determined based on a minimum threshold of the scores or a maximum number of the substitutes to be transmitted.

In an embodiment, a method can be implemented via execution of computing instructions configured to run at one or more processors and stored at one or more non-transitory computer-readable media. In this embodiment, the method can comprise: receiving an inquiry from a user, wherein the inquiry comprises an image and a text describing a requested product; extracting one or more visual attributes of the requested product based on the image; extracting one or more textual attributes of the requested product based on the text; determining a first projected requested product, in a product graph relating to a domain of the requested product, based on the one or more visual attributes of the requested product; determining a second projected requested product in the product graph based on the one or more textual attributes of the requested product; and determining one or more substitutes for the requested product.

In this embodiment, the one or more substitutes for the requested product can be determined by: determining one or more first candidates, each first candidate of the one or more first candidates existing in both the product graph and an inventory database and comprising a visual distance between the first projected requested product and the each first candidate in the product graph; determining one or more second candidates, each second candidate of the one or more second candidates existing in both the product graph and the inventory database and comprising a textual distance between the second projected requested product and the each second candidate in the product graph, the one or more substitutes comprising the one or more first candidates and the one or more second candidates; determining a score of a candidate substitute of the one or more substitutes based on a visual distance and a textual distance of the candidate substitute of the one or more substitutes; and sorting the one or more substitutes based on the score of the candidate substitute of the one or more substitutes.

In this embodiment, after the one or more substitutes are determined and sorted, this method can further comprise: in response to receiving the inquiry from the user, automatically transmitting to the user higher ranked ones of the one or more substitutes. Additionally, in this embodiment, the product graph can be dynamically generated by a machine learning module based on information about the domain of the requested product; and the product graph can comprise: (a) one or more product nodes, the one or more product nodes comprising the one or more substitutes; (b) one or more entity nodes, the one or more entity nodes comprising the one or more visual attributes and the one or more textual attributes of the requested product; (c) one or more entity-entity connections between each pair of related entity nodes of the one or more entity nodes; (d) one or more product-entity connections between a product node of the one or more product nodes and an entity node of the one or more entity nodes, wherein the entity node is related to the product node; and (e) one or more product-product connection between a first product node of the one or more product nodes and a second product node of the one or more product nodes, wherein the first product node and the second product node are determined to be substitutable by or complimentary of each other.

In another embodiment, a system can comprise one or more processors; and one or more non-transitory computer-readable media storing computing instructions configured to run on the one more processors and perform a method for providing one or more substitutes in a descending order based on the similarities between the one or more substitutes and the request product described in an inquiry from a user. In this embodiment, the method can be similar to the methods described herein, such as method 1300 (FIG. 13) or the method in the previous embodiment.

In many embodiments, the machine learning model, such as machine learning module 320 (FIG. 3), machine learning module 540 (FIG. 5), or machine learning module 1010 (FIG. 10), can be pre-trained, but also can consider both historical and dynamic input from one or more expert opinions, the inventory database, such as inventory database 560 (FIG. 5) or inventory database 1030 (FIG. 10), and/or public records, such as public records 570 (FIG. 5) or public records 1050 (FIG. 10). In many embodiments, the technique described herein can dynamically generate and update a product graph, such as product graph 350 (FIG. 3), product graph 510 (FIG. 5), product graph 610 (FIG. 6), product graph 1020 (FIG. 10), or product graph 1120 (FIG. 11), based on the use of current, dynamic data from the one or more expert opinions, the inventory database, and/or public records.

Additionally, in many embodiments, the techniques described herein can be used continuously at a scale that cannot be handled using manual techniques. For example, the number of new public records, such as the publications, product reviews, blog entries, and/or online discussion threads in public records 1050 (FIG. 10), can exceeds thousands per day, if not per hour. As such, it is unrealistic to expect manual solutions to be able to continuously update a product graph in a timely manner.

Although systems and methods for determining substitutes for a requested product and the order of the substitutes have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-13 may be modified, and that the foregoing discussion of certain of these embodiments does not necessarily represent a complete description of all possible embodiments. For example, one or more of the procedures, processes, or activities in the Blocks of FIG. 12 and/or Blocks of FIG. 13 may include different procedures, processes, activities, and/or Blocks and may be performed by many different components in many different orders.

Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:
1. A system comprising:
one or more processors; and
one or more non-transitory computer-readable media storing computing instructions configured to run on the one or more processors and perform:
dynamically training a machine learning module to build a product graph relating to a domain;
receiving, via computer network, an inquiry from a user device for a user, wherein the inquiry comprises an image and a text describing a requested product in the domain;
extracting one or more visual attributes of the requested product based on the extracting one or more textual attributes of the requested product based on the text;
determining a first projected requested product, in the product graph, based on the one or more visual attributes of the requested product;
determining a second projected requested product in the product graph based on the one or more textual attributes of the requested product;
determining one or more substitutes for the requested product by:

determining one or more first candidates, each first candidate of the one or more first candidates existing in both the product graph and an inventory database and comprising a visual distance between the first projected requested product and the each first candidate in the product graph;

determining one or more second candidates, each second candidate of the one or more second candidates existing in both the product graph and the inventory database and comprising a textual distance between the second projected requested product and the each second candidate the product graph, the one or more substitutes comprising the one or more first candidates and the one or more second candidates;

determining a score of a candidate substitute of the one or more substitutes based on the visual distance and the textual distance of the candidate substitute of the one or more substitutes, Wherein a greater weight is given to the visual distance than the textual distance in determining the score; and sorting the one or more substitutes based on the score of the candidate substitute of the one or more substitutes; and in response to receiving the inquiry from the user, automatically transmitting, via the computer network and to the user device for the user, information about higher ranked ones of the one or more substitutes to facilitate a display of the information on a graphical user interface on the user device, wherein:

the product graph comprises:
  a multi-dimensional space;
  one or more product nodes, wherein:
    the one or more product nodes comprise the one or more substitutes; and
    each of the one or more product nodes comprises a respective product coordinate in the multi-dimensional space;
  one or more entity nodes, wherein:
    the one or more entity nodes comprise the one or more visual attributes and the one or more textual attributes of the requested product; and
    each of the one or more entity nodes comprises a respective entity coordinate in the multi-dimensional space;
  one or more entity-entity connections between each pair of related entity nodes of the one or more entity nodes;
  one or more product-entity connections, wherein:
    each of the one or more product-entity connections is between a product node of the one or more product nodes and an entity node of the one or more entity nodes;
    the entity node is related to the product node; and
    the each of the one or more product-entity connections comprises a respective product-entity connection distance determined based on a respective relatedness degree between the product node and the entity node; and
  one or more product-product connections between a first product node of the one or more product nodes and a second product node of the one or more product nodes, wherein the first product node and the second product node are determined to be substitutable by or complimentary of each other;

determining the one or more first candidates further comprises determining the visual distance between the first projected requested product and each first candidate of the one or more first candidates in the product graph based on a respective first vector between the first projected requested product and the each first candidate as projected in each dimension of multiple dimensions of the multi-dimensional space; and determining the one or more second candidates further comprises determining the textual distance between the second projected requested product and each second candidate of the one or more second candidates in the product graph based on a respective second vector between the second projected requested product and the each second candidate as projected in each dimension of the multiple dimensions of the multi-dimensional space.

2. The system in claim 1, wherein the computing instructions are further configured to run on the one or more processors and perform:

extracting one or more color attributes of the requested product based on the image and the text; and determining a color distance of the candidate substitute of the one or more substitutes based on the one or more color attributes of the requested product and one or more color entities of the candidate substitute of the one or more substitutes;

wherein:

the one or more entity nodes of the product graph further comprise the one or more color attributes of the requested product and the one or more color entities of the candidate substitute of the one or more substitutes; and the determining the score of the candidate substitute of the one or more substitutes further comprises determining the score of the candidate substitute of the one or more substitutes based on the color distance of the candidate substitute of the one or more substitutes.

3. The system in claim 2, wherein:

the one or more color attributes of the requested product comprises a product major color and a product minor color; and the one or more color entities of the candidate substitute of the one or more substitutes comprise a candidate major color and a candidate minor color.

4. The system in claim 3, wherein:

the score of the candidate substitute of the one or more substitutes is determined by:

$$\alpha_I \frac{1}{d} + \beta_C \left( \frac{1}{d_{maj-c}} + \frac{1}{d_{mtn-c}} \right) + \gamma_T \frac{1}{d_T};$$

wherein:

$d_1$: the visual distance between the first projected requested product and the candidate substitute of the one or more substitutes;

$d_t$: the textual distance between the second projected requested product and the candidate substitute of the one or more substitutes;

$f_{maj-c}$: a major color distance between the product major color and the candidate major color;

$d_{min-c}$: a minor color distance between the product minor color and the candidate minor color;

$\alpha_I$: a predetermined image weight;

$\beta_C$: a predetermined color weight; and $Y_T$: a predetermined text weight.

5. The system in claim 2, wherein the computing instructions are further configured to run on the one or more processors and perform:

determining a context of the inquiry;

wherein:

the context of the inquiry includes one of an address of the user, a purchase history of the user, another term in the inquiry of the user, a style identified in the image, or another object identified in the image;

the extracting the one or more visual attributes of the requested product further comprises extracting the one or more visual attributes based on the context;

the extracting the one or more textual attributes of the requested product further comprises extracting the one or more textual attributes based on the context; and the extracting the one or more color attributes of the requested product further comprises extracting the one or more color attributes based on the context.

6. The system in claim 1, wherein:

the one or more first candidates comprise a predetermined number of product nodes of the one or more product nodes that comprise lowest visual distances from the first projected requested product among visual distances of the one or more product nodes; and the one or more second candidates comprise the predetermined number of product nodes of the one or more product nodes that comprise lowest textual distances from the second projected requested product among textual distances of the one or more product nodes.

7. The system in claim 1, wherein the machine learning module is configured to:

dynamically learn the information about the domain from one or more expert opinions, the inventory database, and public records;

create one or more product categories in the domain based on the information about the domain;

extract one or more first entity nodes from the one or more product categories based on the information about the domain;

create one or more second entity nodes based on the one or more first entity nodes, each of the one or more second entity nodes being related to at least one of the one or more first entity nodes according to a first set of criteria, wherein:

the one or more entity nodes comprise the one or more first entity nodes and the one or more second entity nodes;

build an entity-entity connection, of the one or more entity-entity connections, between two related entity nodes of the one or more entity nodes, when the two related entity nodes are either associated with one of the one or more product categories or related to each other according to the first set of criteria;

build a product-entity connection with the respective product-entity connection distance, of the one or more product-entity connections, between a first entity node of the one or more entity nodes and a first product node of the one or more product nodes, based on the information about the domain, wherein:

the first product node is related to the first entity node; and the respective product-entity connection distance of the product-entity connection is determined based on the respective relatedness degree between the first entity node and the first product node; and build a product-product connection of the one or more product-product connections, between a first product node and a second product node selected from the one or more product nodes when the first product node and the second product node are determined to be substitutable by or complimentary of each other based on the information about the domain.

8. The system in claim 7, wherein the computing instructions are further configured to run on the one or more processors and perform:

providing a user interface configured to be executed on one or more user computers for one or more advanced users to receive the one or more expert opinions from the one or more advanced users;

wherein:

the public records include at least one of product catalogs, publications, product reviews, blog entries, online discussion threads, search keywords, curated collections, or purchase patterns.

9. The system in claim 7, wherein the first set of criteria used by the machine learning module to determine that a first entity node of the one or more entity nodes is related to a second entity node of the one or more entity nodes comprises:

the first entity node is linguistically similar to the second entity node;

the first entity node is linguistically opposite to the second entity node; and the first entity node is linguistically inferable from the second entity node.

10. The system in claim 7, wherein the machine learning module is further configured to assign a distance value of each of the entity-entity connection and the product-product connection.

11. A method being implemented via execution of computing instructions configured to run at one or more processors and stored at one or more non-transitory computer-readable media, the method comprising:

dynamically training a machine learning module to build a product graph relating to a domain;

receiving, via a computer network, an inquiry from a user device for a user, wherein the inquiry comprises an image and a text describing a requested product in the domain;

extracting one or more visual attributes of the requested product based on the image;

extracting one or more textual attributes of the requested product based on the text;

determining a first projected requested product, in the product graph, based on the one or more visual attributes of the requested product;

determining a second projected requested product in the product graph based on the one or more textual attributes of the requested product;

determining one or more substitutes for the requested product by:

determining one or more first candidates, each first candidate of the one or more first candidates existing in both the product graph and an inventory database and comprising a visual distance between the first projected requested product and the each first candidate in the product graph;

determining one or more second candidates, each second candidate of the one or more second candidates existing in both the product graph and the inventory database and comprising a textual distance between the second projected requested product and the each second candidate in the product graph, the one or more substitutes comprising the one or more first candidates and the one or more second candidates;

determining a score of a candidate substitute of the one or more substitutes based on the visual distance and the textual distance of the candidate substitute of the one or more substitutes, wherein a greater weight is given to the visual distance than the textual distance in determining the score; and sorting the one or more substitutes based on the score of the candidate substitute of the one or more substitutes; and in response to receiving the inquiry from the user, automatically transmitting, via the computer network and to the user device for the user, information about higher ranked ones of the one or more substitutes to facilitate a display of the information on a graphical user interface on the user device, wherein:
the product graph comprises:
a multi-dimensional space;
one or more product nodes, wherein:
the one or more product nodes comprise the one or more substitutes; and
each of die one or more product nodes comprises a respective product coordinate in the multi-dimensional space;
one or more entity nodes, wherein:
the one or more entity nodes comprise the one or more visual attributes and the one or more textual attributes of the requested product; and
each of the one or more entity nodes comprises a respective entity coordinate in the multi-dimensional space;
one or more entity-entity connections between each pair of related entity nodes of the one or more entity nodes;
one or more product-entity connections, wherein:
each of the one or more product-entity connections is between a product node of the one or more product nodes and an entity node of the one or more entity nodes:
the entity node is related to the product node; and
the each of the one or more product-entity connections comprises a respective product-entity connection distance determined based on a respective relatedness degree between the product node and the entity node; and
one or more product-product connections between a first product node of the one or more product nodes and a second product node of the one or more product nodes, wherein the first product node and the second product node are determined to be substitutable by or complimentary of each other;

determining the one or more first candidates further comprises determining the visual distance between the first projected requested product and each first candidate of the one or more first candidates in the product graph based on a respective first vector between the first projected requested product and the each first candidate as projected in each dimension of multiple dimensions of the multi-dimensional space; and determining the one or more second candidates further comprises determining the textual distance between the second projected requested product and each second candidate of the one or more second candidates in the product graph based on a respective second vector between the second projected requested product and the each second candidate as projected in each dimension of the multiple dimensions of the multi-dimensional space.

12. The method in claim 11 further comprising:
extracting one or more color attributes of the requested product based on the image and the text; and
determining a color distance of the candidate substitute of the one or more substitutes based on the one or more color attributes of the requested product and one or more color entities of the candidate substitute of the one or more substitutes;
wherein:
the one or more entity nodes of the product graph further comprise the one or more color attributes of the requested product and the one or more color entities of the candidate substitute of the one or more substitutes; and
the determining the score of the candidate substitute of the one or more substitutes further comprises determining the score of the candidate substitute of the one or more substitutes based on the color distance of the candidate substitute of the one or more substitutes.

13. The method in claim 12, wherein:
the one or more color attributes of the requested product comprises a product major color and a product minor color; and
the one or more color entities of the candidate substitute of the one or more substitutes comprise a candidate major color and a candidate minor color.

14. The method in claim 13, wherein:
the score of the candidate substitute of the one or more substitutes is determined by:

$$\alpha_I \frac{1}{d_I} + \beta_C \left( \frac{1}{d_{maj-c}} + \frac{1}{d_{min-c}} \right) + \gamma_T \frac{1}{d_T};$$

wherein:
$d_I$: the visual distance between the first projected requested product and the candidate substitute of the one or more substitutes;
$d_t$: the textual distance between the second projected requested product and the candidate substitute of the one or more substitutes;
$d_{maj-c}$: a major color distance between the product major color and the candidate major color;
$d_{min-c}$: a minor color distance between the product minor color and the candidate minor color;
$\alpha_I$: a predetermined image weight;
$\beta_C$: a predetermined color weight; and
$\gamma_T$: a predetermined text weight.

15. The method in claim 12 further comprising:
determining a context of the inquiry;
wherein:
the context of the inquiry includes one of an address of the user, a purchase history of the user, another term in the inquiry of the user, a style identified in the image, or another object identified in the image;

the extracting the one or more visual attributes of the requested product further comprises extracting the one or more visual attributes based on the context;

the extracting the one or more textual attributes of the requested product further comprises extracting the one or more textual attributes based on the context; and the extracting the one or more color attributes of the requested product further comprises extracting the one or more color attributes based on the context.

16. The method in claim 11, wherein:

the one or more first candidates comprise a predetermined number of product nodes of the one or more product nodes that comprise lowest visual distances from the first projected requested product among visual distances of the one or more product nodes; and the one or more second candidates comprise the predetermined number of product nodes of the one or more product nodes that comprise lowest textual distances from the second projected requested product among textual distances of the one or more product nodes.

17. The method in claim 11, wherein the machine learning module is configured to:

dynamically learn the information about the domain from one or more expert opinions, the inventory database, and public records;

create one or more product categories in the domain based on the information about the domain;

extract one or more first entity nodes from the one or more product categories based on the information about the domain;

create one or more second entity nodes based on the one or more first entity nodes, each of the one or more second entity nodes being related to at least one of the one or more first entity nodes according to a first set of criteria, wherein:

the one or more entity nodes comprise the one or more first entity nodes and the one or more second entity nodes;

build an entity-entity connection, of the one or more entity-entity connections, between two related entity nodes of the one or more entity nodes, when the two related entity nodes are either associated with one of the one or more product categories or related to each other according to the first set of criteria;

build a product-entity connection with the respective product-entity connection distance, of the one or more product-entity connections, between a first entity node of the one or more entity nodes and a first product node of the one or more product nodes, based on the information about the domain, wherein:

the first product node is related to the first entity node; and the respective product-entity connection distance of the product-entity connection is determined based on the respective relatedness degree between the first entity node and the first product node; and build a product-product connection of the one or more product-product connections, between a first product node and a second product node selected from the one or more product nodes when the first product node and the second product node are determined to be substitutable by or complimentary of each other based on the information about the domain.

18. The method in claim 17 further comprising:

providing a user interface configured to be executed on one or more user computers for one or more advanced users to receive the one or more expert opinions from the one or more advanced users;

wherein:

the public records include at least one of product catalogs, publications, product reviews, blog entries, online discussion threads, search keywords, curated collections, or purchase patterns.

19. The method in claim 17, wherein the first set of criteria used by the machine learning module to determine that a first entity node of the one or more entity nodes is related to a second entity node of the one or more entity nodes comprises:

the first entity node is linguistically similar to the second entity node;

the first entity node is linguistically opposite to the second entity node; and the first entity node is linguistically inferable from the second entity node.

20. The method in claim 17, wherein the machine learning module is further configured to assign a distance value of each of the entity-entity connection and the product-product connection.

* * * * *